US012082244B2

(12) United States Patent
Sun et al.

(10) Patent No.: US 12,082,244 B2
(45) Date of Patent: Sep. 3, 2024

(54) DYNAMIC PHYSICAL DOWNLINK CONTROL CHANNEL (PDCCH) MONITORING MODE SWITCHING, CONFIGURATION, AND CONTROL

(71) Applicant: QUALCOMM Incorporated, San Diego, CA (US)

(72) Inventors: Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,869

(22) Filed: Feb. 27, 2020

(65) Prior Publication Data
US 2020/0314898 A1  Oct. 1, 2020

(30) Foreign Application Priority Data

Mar. 28, 2019 (IN) .............................. 201941012236

(51) Int. Cl.
 *H04W 72/0446* (2023.01)
 *H04L 1/1812* (2023.01)
 (Continued)

(52) U.S. Cl.
 CPC ....... *H04W 74/0808* (2013.01); *H04L 1/1819* (2013.01); *H04L 5/0055* (2013.01);
 (Continued)

(58) Field of Classification Search
 CPC ........... H04W 74/0808; H04W 72/042; H04W 72/0446; H04W 76/27; H04W 68/005;
 (Continued)

(56) References Cited

U.S. PATENT DOCUMENTS 9,276,721 B2 * 3/2016 Seo ..................... H04W 88/02
9,392,592 B2 * 7/2016 Baker .................. H04L 5/0096
(Continued)

FOREIGN PATENT DOCUMENTS

CN  107210871 A   9/2017
TW   I507065 B   11/2015
(Continued)

OTHER PUBLICATIONS

International Search Report and Written Opinion—PCT/US2020/021480—ISA/EPO—dated Jun. 4, 2020.
(Continued)

*Primary Examiner* — Nishant Divecha
(74) *Attorney, Agent, or Firm* — Haynes and Boone, LLP

(57) ABSTRACT

Wireless communications systems and methods related to downlink control channel communications in a wireless communication network are provided. A first wireless communication device communicates, with a second wireless communication device, a configuration indicating a first group of one or more search spaces and a second group of one or more search spaces, where at least one of the first group or the second group includes at least one search space not included in an other of the first group or the second group. The first wireless communication device communicates, with the second wireless communication device, a first downlink control information (DCI) message in a first search space of the first group of one or more search spaces. The first wireless communication device communicates, with the second wireless communication device, a second DCI message in a second search space of the second group of one or more search spaces.

30 Claims, 13 Drawing Sheets

(51) Int. Cl.
*H04L 5/00* (2006.01)
*H04W 72/23* (2023.01)
*H04W 74/08* (2009.01)
*H04W 74/0808* (2024.01)
*H04W 76/27* (2018.01)

(52) U.S. Cl.
CPC ....... *H04W 72/0446* (2013.01); *H04W 72/23* (2023.01); *H04W 76/27* (2018.02)

(58) Field of Classification Search
CPC ............. H04W 52/0216; H04L 1/1819; H04L 5/0055; H04L 1/1854; H04L 5/0048; H04L 5/0053; H04L 5/0094; H04L 5/001; Y02D 30/70
See application file for complete search history.

(56) References Cited

U.S. PATENT DOCUMENTS

| | | | |
|---|---|---|---|
| 9,445,409 B2* | 9/2016 | Liao | H04W 72/042 |
| 10,382,270 B2* | 8/2019 | You | H04L 5/0053 |
| 10,568,116 B2* | 2/2020 | Park | H04W 74/0808 |
| 10,568,135 B2* | 2/2020 | Park | H04W 72/1278 |
| 10,631,280 B2* | 4/2020 | Baldemair | H04L 5/0092 |
| 10,945,209 B2* | 3/2021 | Kim | H04W 52/0216 |
| 10,952,199 B2* | 3/2021 | Kim | H04L 5/0044 |
| 11,166,285 B2* | 11/2021 | Kim | H04W 72/0493 |
| 11,212,747 B2* | 12/2021 | Zhou | H04W 76/28 |
| 11,546,940 B2* | 1/2023 | Hedayat | H04W 52/34 |
| 2005/0136940 A1 | 6/2005 | An | |
| 2008/0031172 A1 | 2/2008 | Nanda et al. | |
| 2008/0031222 A1 | 2/2008 | Nanda et al. | |
| 2008/0031223 A1 | 2/2008 | Nanda et al. | |
| 2010/0002590 A1 | 1/2010 | Park et al. | |
| 2011/0225440 A1 | 9/2011 | Kwon et al. | |
| 2012/0182963 A1 | 7/2012 | Kneckt et al. | |
| 2015/0181620 A1 | 6/2015 | Seok | |
| 2015/0215959 A1 | 7/2015 | Nanda et al. | |
| 2016/0254948 A1* | 9/2016 | Chen | H04W 72/042 370/254 |
| 2017/0019924 A1 | 1/2017 | Wang et al. | |
| 2017/0048861 A1 | 2/2017 | Choi et al. | |
| 2017/0171908 A1 | 6/2017 | Agarwal et al. | |
| 2017/0188336 A1 | 6/2017 | Ahn et al. | |
| 2017/0245302 A1 | 8/2017 | Mukherjee et al. | |
| 2017/0257850 A1 | 9/2017 | Oh et al. | |
| 2018/0084581 A1 | 3/2018 | Terry | |
| 2018/0092073 A1 | 3/2018 | Nogami et al. | |
| 2018/0192405 A1 | 7/2018 | Gong et al. | |
| 2018/0220485 A1 | 8/2018 | Su et al. | |
| 2018/0242373 A1 | 8/2018 | Wang et al. | |
| 2018/0368164 A1 | 12/2018 | Lunden et al. | |
| 2019/0053222 A1 | 2/2019 | Bhorkar et al. | |
| 2019/0053293 A1 | 2/2019 | Akoum et al. | |
| 2019/0158205 A1 | 5/2019 | Sheng et al. | |
| 2019/0246425 A1 | 8/2019 | Zhang et al. | |
| 2019/0268931 A1 | 8/2019 | He et al. | |
| 2019/0297579 A1 | 9/2019 | Bhattad et al. | |
| 2019/0313383 A1* | 10/2019 | Xiong | H04W 16/14 |
| 2020/0163062 A1 | 5/2020 | Takeda et al. | |
| 2020/0187236 A1 | 6/2020 | Moon et al. | |
| 2020/0236699 A1 | 7/2020 | Nakashima et al. | |
| 2020/0260442 A1 | 8/2020 | Yi | |
| 2020/0305193 A1 | 9/2020 | Kim et al. | |
| 2020/0344792 A1 | 10/2020 | Liu et al. | |
| 2021/0050944 A1 | 2/2021 | Zhang et al. | |
| 2021/0368367 A1 | 11/2021 | Jiang et al. | |
| 2022/0141805 A1* | 5/2022 | Tooher | H04W 74/0808 370/336 |
| 2023/0032957 A1 | 2/2023 | Bhattad et al. | |

FOREIGN PATENT DOCUMENTS

| | | |
|---|---|---|
| TW | 201722182 A | 6/2017 |
| WO | 2017213759 A1 | 12/2017 |
| WO | 2018127802 A1 | 7/2018 |
| WO | 2019191116 A1 | 10/2019 |
| WO | 2020060931 A1 | 3/2020 |

OTHER PUBLICATIONS

Qualcomm Incorporated: "DL Signals and Channels for NR-U," 3GPP Draft, 3GPP TSG RAN WG1 Meeting#96, R1-1902983 7.2.2.1.2, DL Signals and Channels for NR-U, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar 1, 2019, Feb. 16, 2019 (Feb. 16, 2019), XP051600680, 8 pages, Retrieved from the Internet: URL: http://www.3gpp.org/ftp/tsg%5Fran/WG1%5FRL1/TSGR1%5F96/Docs/R1%2D1902983%2Ezip [retrieved on Feb. 16, 2019], sections 2, 4, 7.

ZTE: "Considerations on DL Reference Signals and Channels Design for NR-U", 3GPP Draft, 3GPP TSG RAN WG1 Meeting #95, R1-1812433, Considerations on DL reference Signals and Channels Design for NR-U Final, 3rd Generation Partnership Project (3GPP), Mobile Competence Centre, 650, Route Des Lucioles, F-06921, Sophia- Antipolis Cedex, France, vol. RAN WG1, No. Spokane, USA; Nov. 12, 2018-Nov. 16, 2018, Nov. 11, 2018 (Nov. 11, 2018), XP051554348, 8 pages, Retrieved from the Internet: URL: http://www.3gpp.org/ftp/Meetings%5F3GPP%5FSYNC/RAN1/Docs/R1%2D1812433%2Ezip [retrieved on Nov. 11, 2018].

3GPP TS 38.213: "3rd Generation Partnership Project, Technical Specification Group Radio Access Network, NR, Physical Layer Procedures for Control (Release 16)", 3GPP Standard, Technical Specification, 3GPP TS 38.213, 3rd Generation Partnership Project (3GPP), Mobile Competence Centre, 650, Route Des Lucioles, F-06921, Sophia- Antipolis, Cedex, France, vol. RAN WG1, No. V16.0.0, Dec. 2019, Jan. 14, 2020 (Jan. 14, 2020), XP051860806, pp. 1-146, Retrieved from the Internet: URL: http://ftp.3gpp.org/Specs/archive/38_series/38.213/38213-g00.docx [retrieved on Jan. 14, 2020], section 7.6.2, Section 10, Section 10.1, p. 100, Section 10.3, Paragraph [09.1], clause 7.2.1, p. 23-p. 25, clause 9, p. 4 9, paragraph 3 clause 9.1, p. 49, paragraph 4—paragraph 15 clause 9.1.1, p. 50, paragraph 5—paragraph 6 clause 9.1.2.1, p. 55 clause 9.1.3, p. 57, paragraph 8 clause 9.1.3.1, p. 61, paragraph 1—paragraph 2 clause 9.1.3.2, p. 63, paragraph 6 clause 9.1.3.3, p. 64, paragraph 1—p. 65, paragraph 10, p. 56. paragraph 6—p. 57, paragraph 1 ch , 9.2.3, p. 73, paragraph, 5 p. 44, paragraph 8, p. 10, paragraph 1 p. 105—p. 106, tables 10.2.1. 10.2.2.

Apple Inc: "NR Unlicensed Considerations", 3GPP Draft; R1-1802287_NR Unlicensed Considerations, 3rd Generation Partnership Project (3GPP), Mobile Competence Centre, 650, Route Des Lucioles; F-06921 Sophia- Antipolis Cedex, France, vol. RAN WG1, No. Athens, Greece; Feb. 26, 2018-Mar. 2, 2018, Feb. 17, 2018 (Feb. 17, 2018), pp. 1-5, XP051397607, Retrieved from the Internet: URL: http://www.3gpp.org/ftp/tsg_ran/WG1_RL1/TSGR1_92/Docs/ [retrieved on Feb. 17, 2018], Mini-slot and Configurable Search Space Monitoring, p. 2.

Qualcomm Incorporated: "TxOP Frame Structure for NR Unlicensed", 3GPP Draft; R1-1802866, 3GPP TSG RAN WG1 Meeting #92, 7.6.5 Frame Structure for NR Unlicensed, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-5, XP051398279, Retrieved from the Internet: URL: http://www.3gpp.org/ftp/tsg_ran/WG1_RL1/TSGR1_92/Docs/ [retrieved on Feb. 17, 2018], Section 3.1 Channel usage indication, Figure 3, p. 3; 3.2 CSI determination, Proposal 2, p. 4; Figure 6, p. 4; 4.Data transmission stage.

Zte, et al., "Discussion on NR Operation in Unlicensed Spectrum", 3GPP Draft, 3GPP TSG RAN WG1 Meeting #88, R1-1701619-8. 1.10 Discussion on NR Operation In Unlicensed Spectrum, 3rd Generation Partnership Project (3GPP), Mobile Competence Centre, 650, Route Des Lucioles, F-06921 Sophia-Antipo, vol. RAN WG1, No. Athens, Greece, Feb. 13, 2017-Feb. 17, 2017, Feb. 12, 2017 (Feb. 12, 2017), XP051208786, 8 Pages, Retrieved from the

(56) References Cited

OTHER PUBLICATIONS

Internet: URL:http://www.3gpp.org/ftp/Meetings_3GPP_SYNC/RAN1/Docs/ [retrieved on Feb. 12, 2017], Minimization of Reservation Signal with Flexible TTI Size Setting, p. 4, p. 5; Resource Allocation, p. 5.

Zte., et al., "Framework on Potential Solutions and Techniques for NR-U", 3GPP Draft; R1-1801466-7.6.4 Framework on Potential Solutions and Techniques for NR-U, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-8, XP051397565, Retrieved from the Internet: URL: http://www.3gpp.org/ftp/tsg_ran/WG1_RL1/TSGR1_92/Docs/ [retrieved on Feb. 17, 2018], High Frequency/Beam-Based LBT, p. 3 and p. 4.

LG Electronics: "Control Design for D2d Broadcast Communication", 3GPP TSG RAN WG1 Meeting #76bis, R1-141349, No. Shenzhen, China, Mar. 31, 2014-Apr. 4, 2014, 6 Pages, Mar. 22, 2014.

Fujitsu: "Discussion on Time Domain Resource Allocation", 3GPP TSG RAN WG1 Meeting #90, R1-1712742 Discussion on Time Domain Resource Allocation Final, 3rd Generation Partnership Project (3GPP), Mobile Competence Centre, 650, Route Lucioles, F-06921 Sophia-Antipolis Ced, vol. RAN WG1, No. Prague, Czech Republic, Aug. 21, 2017-Aug. 25, 2017, 4 Pages, Aug. 20, 2017, XP051315555, Discussion, p. 2, paragraph 2—p. 3.

Taiwan Search Report—TW109107838—TIPO—dated Jun. 14, 2023.

Taiwan Search Report—TW109107838—TIPO—Jan. 16, 2024.

\* cited by examiner

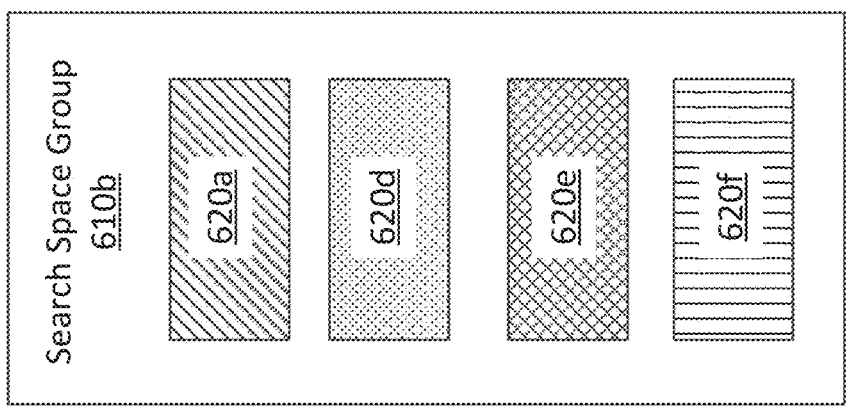
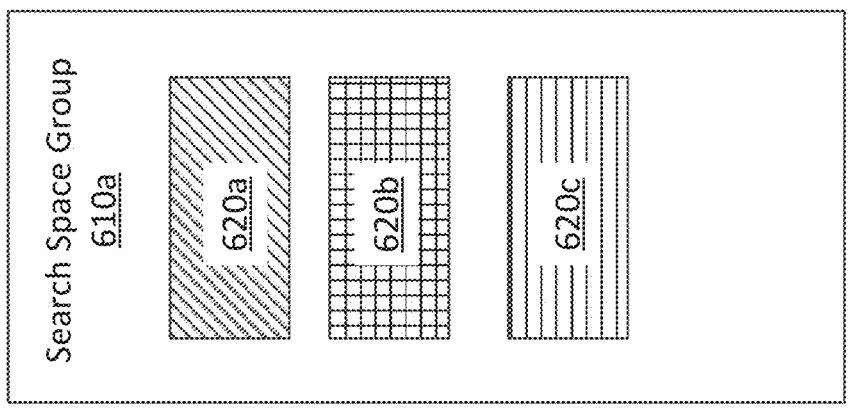
FIG. 6

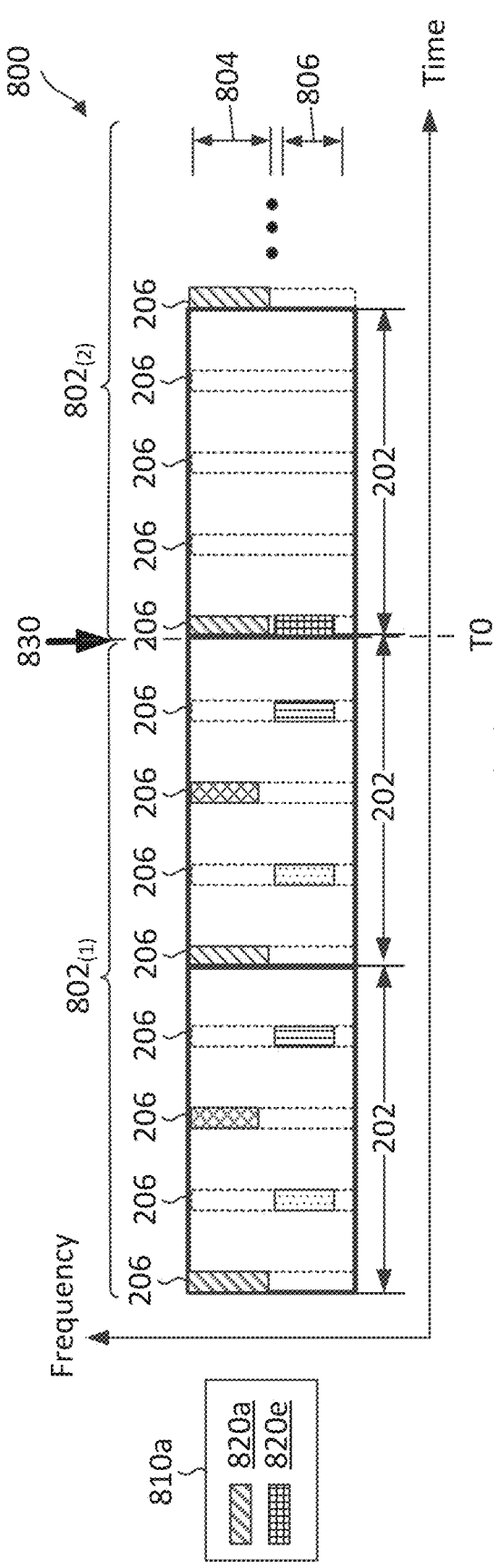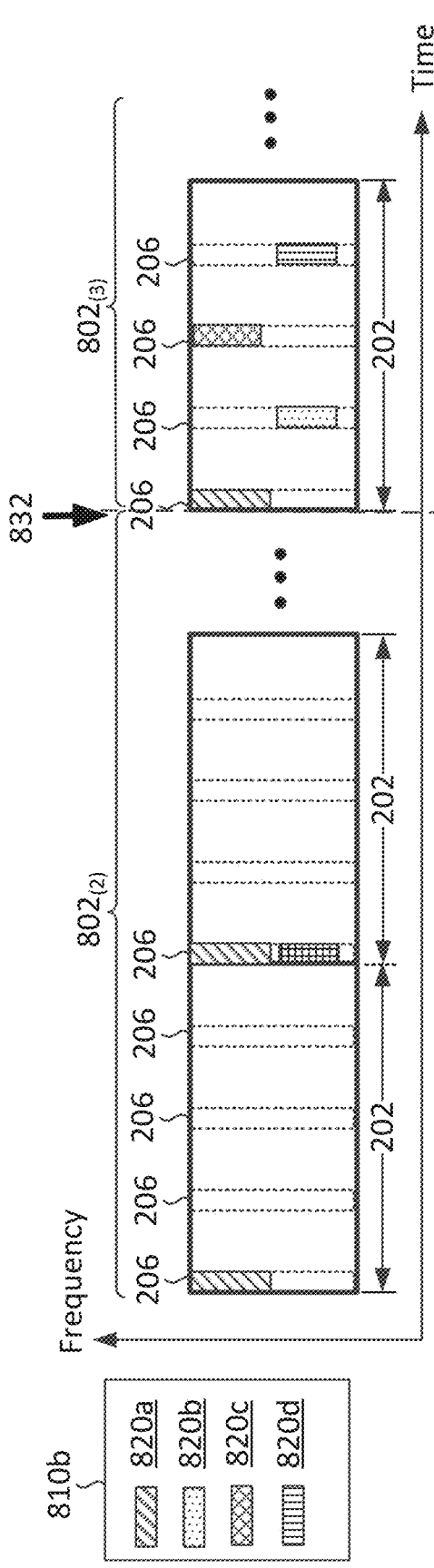
FIG. 8A
FIG. 8B

DYNAMIC PHYSICAL DOWNLINK CONTROL CHANNEL (PDCCH) MONITORING MODE SWITCHING, CONFIGURATION, AND CONTROL

CROSS REFERENCE TO RELATED APPLICATIONS

The present application claims priority to and the benefit of Indian Provisional Patent Application No. 201941012236, filed Mar. 28, 2019, which is hereby incorporated by reference in its entirety as if fully set forth below and for all applicable purposes.

TECHNICAL FIELD

This application relates to wireless communication systems, and more particularly to downlink control channel communications in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a search space refers to a time-frequency region in a transmission slot where downlink (DL) control information is carried. The search spaces are typically located at the beginning of a transmission slot. Some examples of DL control information may include slot format information, UL scheduling grants, and/or DL scheduling grants. Slot format information may indicate whether each slot in a set of slots is configured for UL communication, DL communication, or flexible (for DL or UL communication). A UL scheduling grant may indicate scheduling information for UL communications. A DL scheduling grant may indicate scheduling information for DL communication. A BS may configure a UE with multiple search spaces for DL control channel monitoring. The BS may configure the search spaces to be repeated at some time intervals. The UE may perform blind decoding in the search spaces to search for DL control information from the BS. The UE may communicate with the BS based on detected DL control information.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes communicating, by a first wireless communication device with a second wireless communication device, a configuration indicating a first group of one or more search spaces and a second group of one or more search spaces, where at least one of the first group or the second group includes at least one search space not included in an other of the first group or the second group; communicating, by the first wireless communication device with the second wireless communication device, a first downlink control information (DCI) message in a first search space of the first group of one or more search spaces; and communicating, by the first wireless communication device with the second wireless communication device, a second DCI message in a second search space of the second group of one or more search spaces.

In an additional aspect of the disclosure, an apparatus includes a transceiver configured to communicate, with a wireless communication device, a configuration indicating a first group of one or more search spaces and a second group of one or more search spaces, where at least one of the first group or the second group includes at least one search space not included in an other of the first group or the second group; communicate, with the wireless communication device, a first downlink control information (DCI) message in a first search space of the first group of one or more search spaces; and communicate, with the wireless communication device, a second DCI message in a second search space of the second group of one or more search spaces.

In an additional aspect of the disclosure, a non-transitory computer-readable medium having program code recorded thereon, the program code includes code for causing a first wireless communication device to communicate, with a second wireless communication device, a configuration indicating a first group of one or more search spaces and a second group of one or more search spaces, where at least one of the first group or the second group includes at least one search space not included in an other of the first group or the second group; code for causing the first wireless communication device to communicate, with the second wireless communication device, a first downlink control information (DCI) message in a first search space of the first group of one or more search spaces; and code for causing the first wireless communication device to communicate, with the second wireless communication device, a second DCI message in a second search space of the second group of one or more search spaces.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 illustrates a search space group configuration scheme according to some embodiments of the present disclosure.

FIG. 8A illustrates a DL control channel monitoring configuration with dynamic search space group switching according to some embodiments of the present disclosure.

FIG. 8B illustrates a DL control channel monitoring configuration dynamic search space group switching according to some embodiments of the present disclosure.

DETAILED DESCRIPTION

Figure 1:
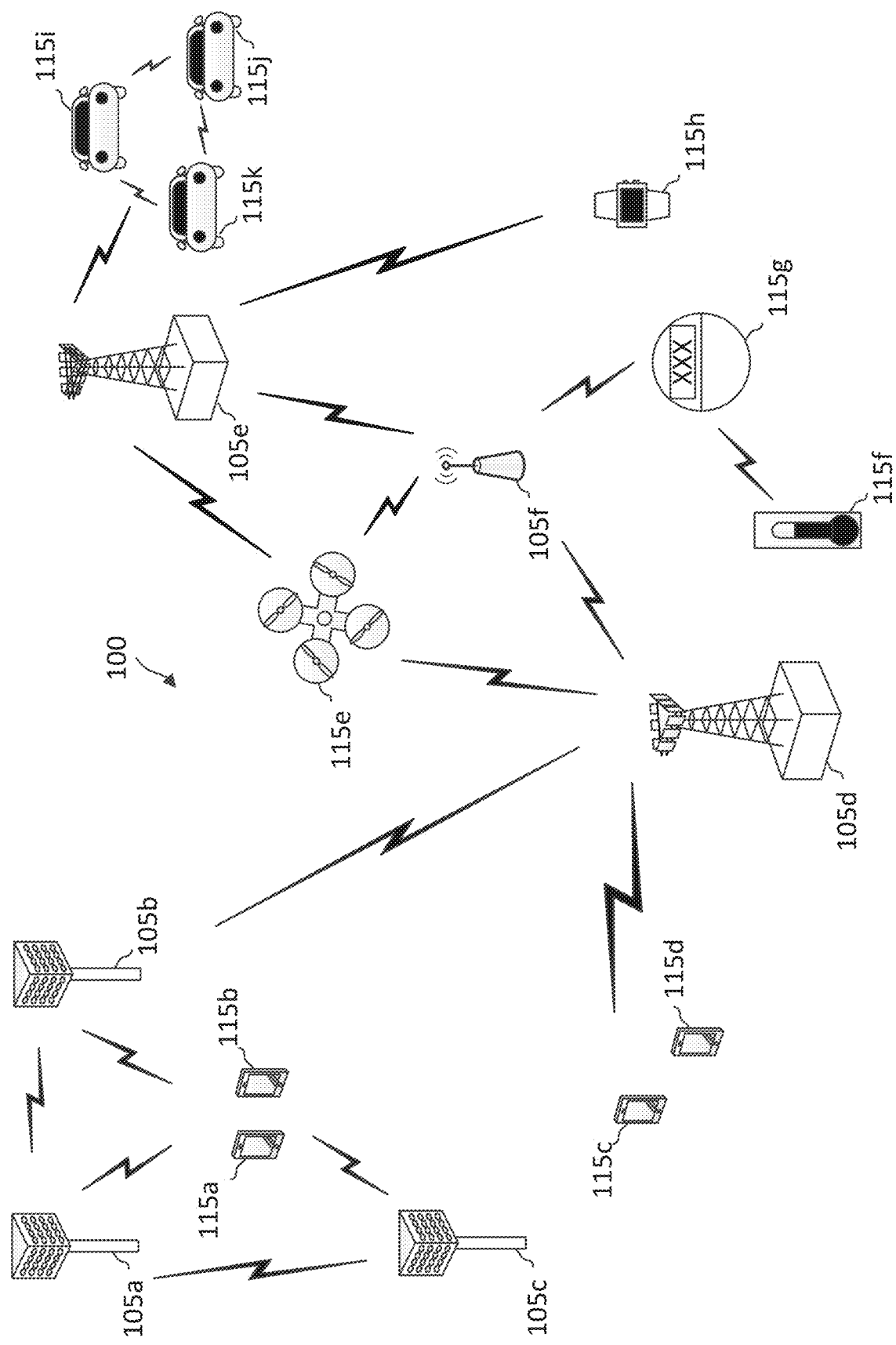
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, orthogonal frequency division multiplexing (OFDM) and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The operations or deployments of NR in an unlicensed spectrum is referred to as NR-U. One approach to avoiding collisions when communicating in an unlicensed frequency (e.g., a shared channel) is to use a listen-before-talk (LBT) procedure to ensure that the shared channel is clear before transmitting a signal in the shared channel. Thus, in NR-U, a BS may perform a listen-before-talk (LBT) procedure in an unlicensed band to contend for a transmission opportunity (TXOP) or channel occupancy time (COT). Upon passing the LBT, the COT may start. The BS may schedule one or more UEs for communications within the COT. However, the completion time of the contention-based LBT procedure is unpredictable. Thus, a COT may begin at any time.

For unlicensed operations, when downlink (DL) control channel search spaces are limited the beginning of a transmission slots, the performance can be impacted depending on the LBT completion time or the COT start time. For example, when a COT starts in the middle of a transmission slot, the BS may not be able to schedule the UE until the next transmission slot boundary, leaving an idle period with no transmission between the COT starting time and the next transmission slot. The idle period may allow another node to access the unlicensed frequency band and continue the access in the next transmission slot in the COT when the BS communicates with a UEs, causing collision and/or interference to the communication between the BS and the UE.

One approach to reducing the duration of the idle period is to configure a UE to monitor for DL control information more frequently, for example, at a mini-slot boundary instead of at a slot boundary. A slot may include about twelve symbols or about fourteen symbols. A mini-slot may include a few symbols (e.g., about 2 or 3). As such, when a COT starts at the middle of a transmission slot, the BS may schedule a UE at the next mini-slot boundary instead of at a next slot boundary. However, the frequent monitoring can be power consuming at the UE, and thus may not be desirable. In addition, the frequent monitoring may be performed at the initial portion of the COT and may not be necessary throughout the entire COT.

The present application describes mechanisms for dynamic DL control channel monitoring mode switching, configuration, and control. A BS may configure a UE with multiple groups of search spaces for DL control channel monitoring to provide different time and/or frequency monitoring patterns. Each group may include a different set of search spaces. For example, between two search space groups, at least one search space may be included in one search space group, but not in the other search space group. The BS may configure the UE to monitor for DL control information in one group at any given time. The BS may configure the UE with triggering conditions for switching among the groups. The triggering conditions can include a combination of physical layer signaling (e.g., a group switch command), a detection of a start of a COT, a detection of an end of a COT, a detection of a scheduling grant, a lack of detection of a scheduling grant, and timer. The BS may configure the UE with a reference time grid or timeline for switching from one group to another group so that the BS and the UE may switch to a search space group at the same time.

In an embodiment, to improve robustness, the BS may configure a common search space in two more groups of search spaces. Thus, when a UE misses a trigger for a search space group switch, the UE may be able to detect DL control information from the BS in the common search space. The BS may additionally or alternatively repeat the transmissions of a search space group switch command to reduce miss detection at the UE. The BS may transmit a search space group switch command in a physical layer message (e.g., a DL control information (DCI) message)) using a search space that is monitored by the UE.

In an embodiment, the BS may trigger a search space group switch based on traffic patterns. For example, when data or traffic arrives for a UE, the BS may switch the UE to a search space group with a more frequent monitoring pattern. When there is no traffic or infrequent traffic for the UE, the BS may switch the UE to a search space group with a less frequent monitoring pattern. Thus, the dynamic search space group switching may allow for power savings at the UE.

In an embodiment, the BS may configure the UE to use a search space group with a more frequent monitoring pattern (e.g., at intervals of about 2 symbols or about 3 symbols) during a period outside of a COT. The BS may configure the UE to switch to a search space group with a less frequent monitoring pattern upon a detection of a start of a COT. The BS may configure the UE to switch to a search space group with a more frequent monitoring pattern upon a detection of an end of a COT. The switching based on the start and/or the end of the COT allows the BS to schedule the UE for communication with a minimal delay (e.g., less than about 3 symbols) upon gaining a COT, yet providing opportunities for the UE to save power when frequent monitoring is not needed within the COT.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information from the BS. In an example, the BS 105 may configure the UE 115 with the BWPs, the CORESETS, and/or the PDCCH search spaces via RRC configurations. Mechanisms for configuring search spaces are described in greater detail herein.

In an embodiment, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) in the shared channel by performing a CAT4 LBT. A CAT4 LBT refers to an LBT with a random backoff and a variable contention window. Upon passing the LBT, the BS 105 may schedule one or more UEs 115 for DL communications and/or UL communications within the acquired COT.

According to embodiments of the present disclosure, a BS 105 may configure a UE 115 with multiple groups of PDCCH search spaces for PDCCH monitoring. The different groups of PDCCH search spaces may provide different monitoring periodicities, for example, at a slot boundary for less frequency monitoring or at a mini-slot boundary for more frequent monitoring. The BS 105 may dynamically configure the UE 115 to switch among the PDCCH search space groups depending on traffic patterns and/or PDCCH monitoring requirements. Mechanisms for configuring multiple PDCCH search space groups and dynamically switching among the PDCCH search space groups are described in greater detail herein.

Figure 2:
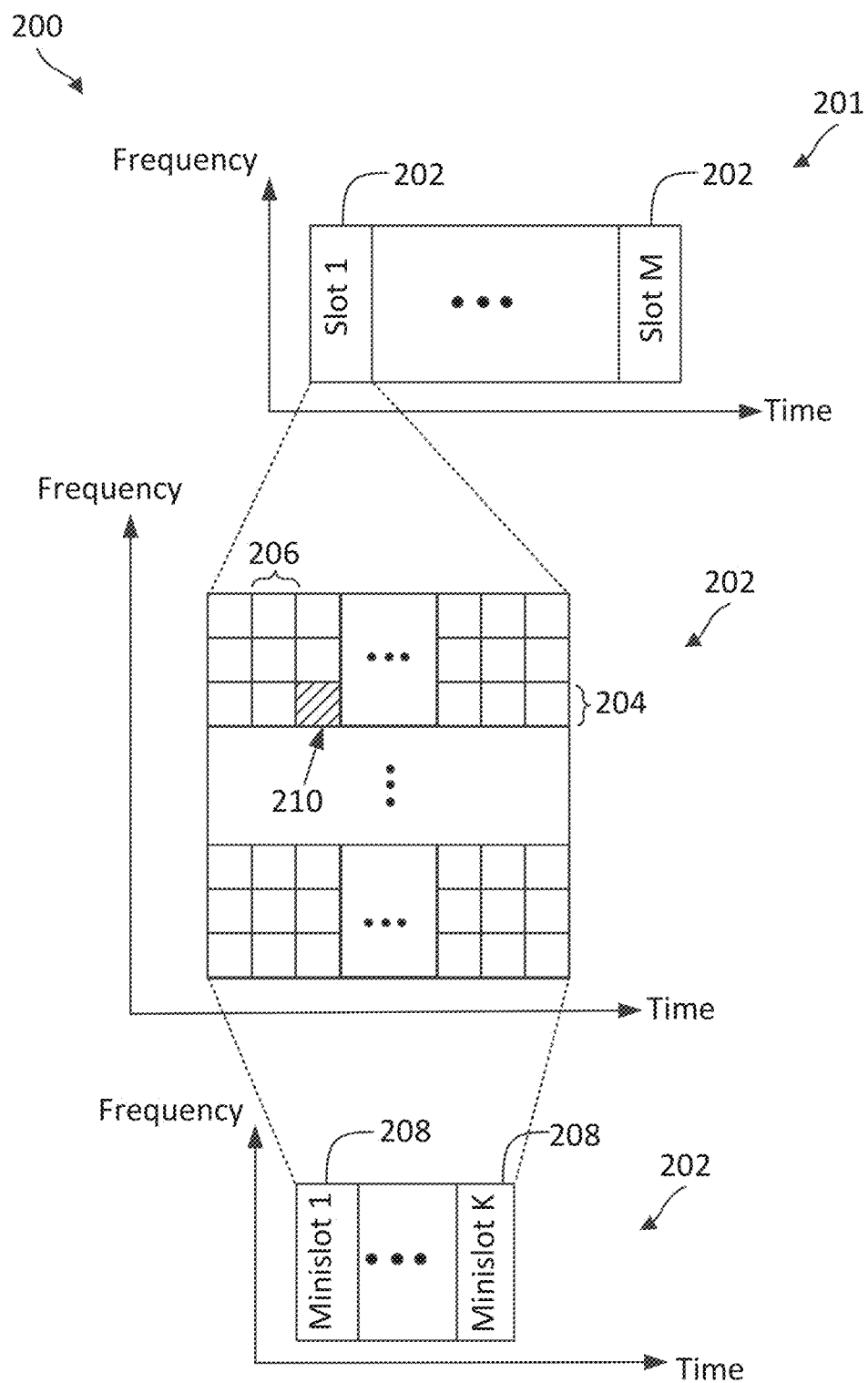
FIG. 2 is a timing diagram illustrating a transmission frame structure according to some embodiments of the present disclosure.

FIG. 2 is a timing diagram illustrating a transmission frame structure 200 according to some embodiments of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the embodiments. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the embodiments, for example, based on the channel bandwidth, the subcarrier spacing (SCS), and/or the cyclic prefix (CP) mode. One subcarrier 204 in frequency and one symbol 206 in time forms one resource element (RE) 210 for transmission.

ABS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some embodiments, a mini-slot 208 may have a length of about two symbols 206, about four symbols 206, or about seven symbols 206. The BS may configure certain time-frequency resources (e.g., a set of REs 210) within a slot 202 for DL control channel monitoring and the resources may be repeated at some intervals as described in greater detail herein.

Figure 3:
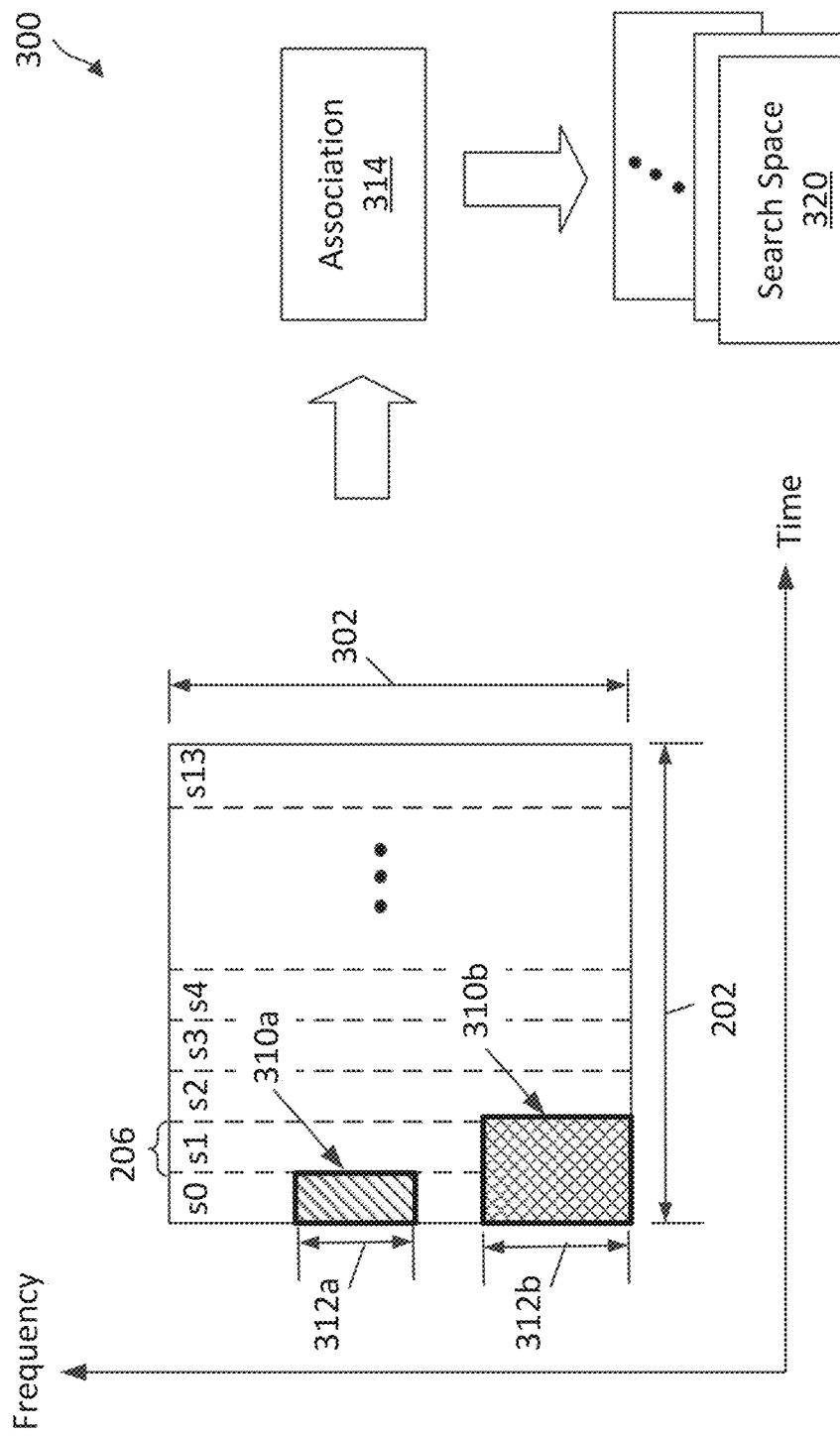
FIG. 3 illustrates a downlink (DL) control channel search space scheme according to some embodiments of the present disclosure.

FIG. 3 illustrates a DL control channel search space configuration scheme 300 according to some embodiments of the present disclosure. The scheme 300 may be employed by BSs such as the BSs 105 and UEs such as the UEs 115 in a network such as the network 100. In particular, the BS may employ the scheme 300 to configure the UE with search spaces for DL control channel monitoring. In FIG. 3, the x-axis represents time in some arbitrary units and the y-axis represents frequency in some arbitrary units. The scheme 300 is described using the transmission frame structure 200 of FIG. 2, and may use the same reference numerals in FIG. 2 for simplicity sake. Further, the symbols 206 in the slot 202 are shown as s0, s1, s3, s4, . . . s13.

In the scheme 300, a BS (e.g., BS 105 in FIG. 1) may configure a UE (e.g., UE 115 in FIG. 1) with one or more CORESETs 310 in a BWP 302. FIG. 3 illustrates two CORESETs 310, shown as 310a and 310b, for purposes of simplicity of illustration and discussion, though it will be recognized that embodiments of the present disclosure may scale to many more CORESETs 310, for example, about 3, 4 or more. Each CORESET 310 may include a set of resources spanning a certain subcarrier range frequency 312 (shown as 312a for CORESET 310a and 312b for CORESET 310b) and a number of symbols 206 (e.g., about 1, 2, or 3) within a slot 202. The CORESET 310a includes one symbol 206 and the CORESET 310b include two symbols 206. Each CORESET 310 has an associated control channel element (CCE) to resource element group (REG) mapping. A REG may include a group of REs 210. The CCE defines how DL control channel data may be transmitted. While FIG. 3 illustrates the two CORESETs 310a and 310b with non-overlapping frequency resources, in some embodiments, two CORESETs 310 can be partially overlapping in frequency.

The BS may configure the UE with one or more search spaces 320 by associating a CORESET 310 with a starting position (e.g., a starting slot 202), a symbol 206 location within a slot 202, a periodicity or a time pattern, and candidate mapping rules as shown by the association 314. For examples, a search space 320 may include a set of candidates mapped to CCEs with aggregation levels of 1, 2, 4, 8, and/or 12 CCEs. In some examples, the BS may configure the UE with about three CORESETs 310 in a certain BWP 302 and up to about ten search spaces 320 based on the three CORESETs 310. As an example, a first search space 320 may include the CORESET 310a starting at a symbol 206 indexed s2 within a starting slot 202. The first search space may have a periodicity of about five slots 202 and may have candidates at aggregation levels of 1, 2, 4, and/or 8. A second search space 320 may include the CORESET 310b starting at a symbol 206 indexed s0 within a starting slot 202. The second search space may repeat every slot 202 and may have candidates at aggregation levels of 1, 2, and/or 4. In another example, two search spaces 320 may include the same CORESET 310a, but at different symbol locations, different periodicities, and/or support different candidate aggregation levels.

The UE may perform blind decoding in the search spaces 320 to search for DL control information (e.g., slot format information and/or scheduling information) from the BS. In some examples, the UE may search a subset of the search spaces 320 based on certain rules, for example, associated with the UE's channel estimation and/or blind decoding capabilities.

The present disclosure provides techniques for a BS (e.g., BS 105 in the FIG. 1) to configure multiple groups of search spaces (e.g., the search spaces 320) with different time and/or frequency monitoring patterns and dynamically switch among the groups. The dynamic switching may be signaled via physical layer signaling instead of RRC configurations to provide a fast switching time (e.g., with a delay of a few symbols 206 or a few slots 202 rather than tens of slots 202). The dynamic switching may also be based on certain detections and/or conditions (e.g., a start of a COT, an end of a COT, and/or traffic patterns). The dynamic switching provides the BS with flexibility to control UE's DL control channel monitoring based on traffic and/or scheduling requirements.

Figure 4:
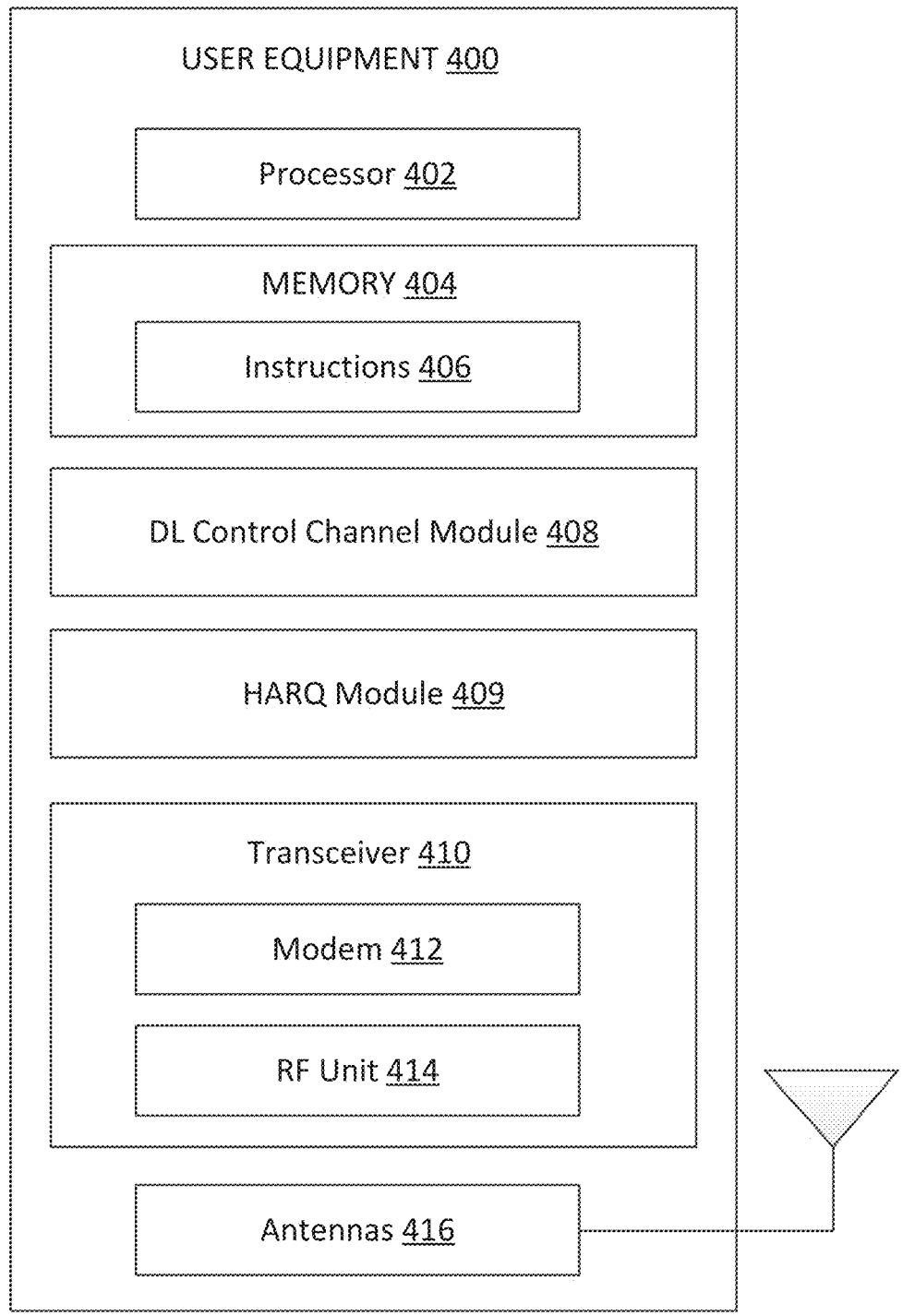
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 in the network 100 as discussed above in FIG. 1. As shown, the UE 400 may include a processor 402, a memory 404, a DL control channel module 408, a HARQ module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 2-3 and 6-13. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the DL control channel module 408 and the HARQ module 409 may be implemented via hardware, software, or combinations thereof. For example, each of the DL control channel module 408 and the HARQ module 409 may be implemented as a processor, circuit, and/or instructions 406 stored in the memory 404 and executed by the processor 402. In some examples, the DL control channel module 408 and the HARQ module 409 can be integrated within the modem subsystem 412. For example, the DL control channel module 408 and the HARQ module 409 can be implemented by a combination of software components (e.g., executed by a DSP or a general processor) and hardware components (e.g., logic gates and circuitry) within the modem subsystem 412. In some examples, a UE may include one of the DL control channel module 408 and the HARQ module 409. In other examples, a UE may include both the DL control channel module 408 and the HARQ module 409.

The DL control channel module 408 and the HARQ module 409 may be used for various aspects of the present disclosure, for example, aspects of FIGS. 2-3 and 6-13. The DL control channel module 408 is configured to receive a search space group configuration from a BS (e.g., BS 105 in FIG. 1). The search space group configuration may indicate multiple groups of search spaces. The DL control channel module 408 is further configured to monitor for DL control information in search spaces of one of the groups at any given time, detect a search space group switch, and switch to another search space group for DL control channel monitoring upon detecting the search space group switch. The DL control channel module 408 is further configured to detect the search space group switch based on a switch command, a COT start, a COT end, and/or a timer. Mechanisms for switching among multiple groups of search spaces for DL control channel monitoring are described in greater detail herein.

The HARQ module 409 is configured to receive DL data from the BS, transmit a HARQ ACK/NACK feedback based on a reception status of the DL data (e.g., based on a certain HARQ codebook), select a HARQ codebook based on a search space group in use or a previous search space group prior to a switch, and/or perform a HARQ procedure as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the DL control channel module 408, and/or the HARQ module 409, according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement RATs.

Figure 5:
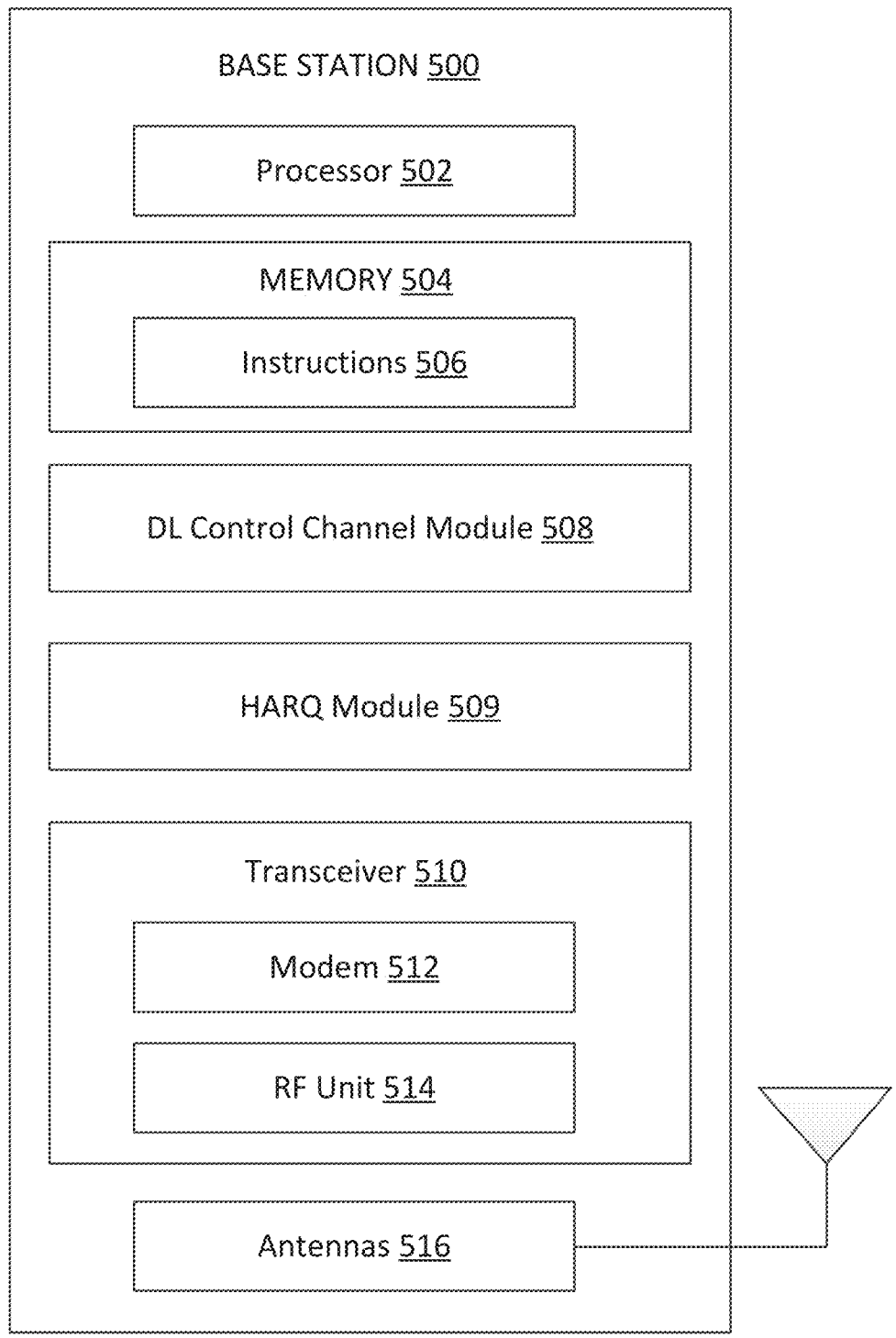
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 in the network 100 as discussed above in FIG. 1. A shown, the BS 500 may include a processor 502, a memory 504, a DL control channel module 508, a HARQ module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-13. Instructions 506 may also be referred to as code, which may be interpreted broadly to include any type of computer-readable statement(s) as discussed above with respect to FIG. 4.

Each of the DL control channel module 508 and the HARQ module 509 may be implemented via hardware, software, or combinations thereof. For example, each of the DL control channel module 508 and the HARQ module 509 may be implemented as a processor, circuit, and/or instructions 506 stored in the memory 504 and executed by the processor 502. In some examples, the DL control channel module 508 and the HARQ module 509 can be integrated within the modem subsystem 512. For example, the DL control channel module 508 and the HARQ module 509 can be implemented by a combination of software components (e.g., executed by a DSP or a general processor) and hardware components (e.g., logic gates and circuitry) within the modem subsystem 512. In some examples, a UE may include one of the DL control channel module 508 and the HARQ module 509. In other examples, a UE may include both the DL control channel module 508 and the HARQ module 509.

The DL control channel module 508 and the HARQ module 509 may be used for various aspects of the present disclosure, for example, aspects of FIGS. 2-3 and 6-13. The DL control channel module 508 is configured to transmit a search space group configuration to a UE (e.g., UE 115 in FIG. 1). The search space group configuration may indicate multiple groups of search spaces. The DL control channel module 508 is further configured to configure the UE with one active search space group at any given time, determine a search space group switch based on traffic patterns and/or scheduling requirements, configure the UE with rules and/or mechanisms for triggering a search space group switch, and/or transmit a search space group switch command to the UE. Mechanisms for configuring multiple groups of search spaces and/or switching among the multiple groups are described in greater detail herein.

The HARQ module 509 is configured to transmit DL data to the UE, receive HARQ ACK/NACK feedback from the UE regarding a reception status of the DL data at the UE, and/or perform HARQ procedure as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 500 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement RATs.

FIG. 6 illustrates a DL control channel search space group configuration scheme 600 according to some embodiments of the present disclosure. The scheme 600 may be employed by a BS such as the BSs 105 and a UE such as the UEs 115 in a network such as the network 100. In the scheme 600, a BS (e.g., BS 105 in FIG. 1) configures a UE (e.g., UE 115 in FIG. 1) with multiple search space groups 610 (shown as 610a and 610b) to facilitate DL control channel monitoring with dynamic search space group switching. FIG. 6 illustrates two search space groups 610a and 610b for simplicity of discussion and illustration, though it will be recognized that embodiments of the present disclosure may scale to many more search space groups 610 (e.g., about 3, 4 or more). Each search space group 610 may include one or more search spaces 620 (shown as 620a, 620b, 620c, 620d, 620e, and 620f. The search spaces 620 may be similar to the search spaces 320. For example, the BS may configure the search spaces 620 based on one more CORESETs (e.g., the CORESETs 310) and associations rules (e.g., the association 314) using the scheme 300 described above in FIG. 3.

Each search space group 610 may include a different set or different combination of search spaces 620. In other words, between two search space groups 610, at least one search space 620 is in one search space group 610, but not in the other search space group 610. In addition, a search space 620 may be included in more than one search space group 610. As shown, the search space group 610a includes the search spaces 620a, 620b, and 620c. The search space group 610a includes the search spaces 620a, 620d, 620e, and 620f. The search space 620a is a common search space between the search space group 610a and the search space group 610b. The search spaces 620b and 620c are included in the search space group 610a, but not in the search space group 610b. The search spaces 620d, 620e, and 620g are included in the search space group 610b, but not in the search space group 610a. In general, a search space group 610 may include any suitable number of search spaces 620.

In an example, the BS may configure the UE with the search space group 610a and the search space group 610b. The BS may configure the UE to monitor for DL control information using one search space group 610 (e.g., 610a or 610b) at any given time. The BS may configure the UE to switch among the search space groups 610. For example, the BS may configure the UE to switch from the search space group 610a to the search space group 610b for DL control channel monitoring at one time and switch back to the search space group 610a after a timer period. A search space group switch may be triggered using various mechanisms. Mechanisms and/or conditions for switching among search space groups 610 are described in greater detail herein.

In some embodiments, a common search space 620 may be included in all search space groups 610 to improve robustness. For example, the UE may miss a trigger for switching from the search space group 610a to the search space group 610b. Thus, the UE may continue to monitor DL control information in the search space group 610a while the BS started to transmit DL control information using the search space group 610b. Since the search space 620a is in both the search space group 610a and the search space group 610b, the UE may be able to receive DL control information when the BS transmits DL control information in the search space 620a.

A search space group configuration may include configuration information for each search space 620 within a search space group 610. For each search space 620, the configuration information may include an identifier (ID) identifying a CORESET used by the search space 620, a starting slot (e.g., the slot 202), a symbol location (e.g., the symbol 206) within a slot, a periodicity, and/or candidate aggregation information as described above in FIG. 3.

In an embodiment, the search space configuration information may additionally include a monitoring state parameter. The monitoring state parameter may indicate one of three states, an always-on state, a default-on state, and a default-off state. A search space 620 configured with an always-on state indicates that a UE may monitor the search space 620 for DL control information from the BS irrespective of which search space group 610 is active at the time. In other words, an always-on search space 620 (e.g., the search space 620a) is a common search space included in all search space groups 610. A search space 620 configured with a default-on state indicates that a UE may monitor the search space 620 for DL control information from the BS by default without having to meet a particular triggering condition and/or when returning from a particular search space group switch (e.g., as a fallback). A search space 620 configured with a default-off state indicates that a UE may monitor the search space 620 for DL control information from the BS when a certain triggering condition is met.

As an example, the search group 610a may be a default search space group and the search space group 610b may be an alternative search space group 610b. Thus, the BS may set the monitoring states for the search spaces 620b and 620c in the search space group 610a to be default-on. The BS may set the monitoring states for the search spaces 620d, 620e, and 620f in the search space group 610b to be default-off The BS may set the monitoring state for the search space 620a 5 to be always-on.

In an embodiment, the search space configuration information may further include a triggering parameter for each search space group 610. The triggering parameter indicates a triggering condition for activating or switching to a particular search space group 610. The triggering condition may be with physical layer signaling, timer, a start of a COT, and/or an end of a COT as described in greater detail below in FIGS. 8 and 9.

In the scheme 600, a group configuration for a search space group 610 may include a configuration information (e.g., including a monitoring state parameter, a CORESET ID, an aggregation rule, a periodicity, and/or a starting position) for each search space 620 within the search space group 610 and a triggering parameter for the search space group 610. For example, a configuration for the search space group 610a may include configuration information for each search space 620a, 620b, 620c within the search group 610a and a triggering parameter for the search space group 610a. Similarly, a group configuration for the search space group 610b may include configuration information each search space 620a, 620d, 620e, 620f within the search space group 610b and a triggering parameter for the search space group 610b. In other words, configuration information for a common search space (e.g., the search space 620a) is included in all group configurations.

In an embodiment, after a BS (e.g., BS 105 in FIG. 1) establishes a configuration with a UE (e.g., UE 115 in FIG. 1), for example, using mechanisms described above in FIG. 1, the BS may configure the UE with a BWP configuration, for example, via an RRC configuration. The RRC BWP configuration may include a PDCCH configuration. The PDCCH configuration may include a SearchSpaceToAddList element including a default search space group configuration (e.g., for the search space group 610a). The default search space group configuration may include configuration information (e.g., a starting position, a periodicity, an aggregation rule, a monitoring state parameter, a trigger parameter) each search space within the default search space group as described above. The PDCCH configuration may include an AltSearchSpaceToAddList element including an alternative search space group configuration (e.g., for the search space group 610b). The alternative search space group configuration may include similar configuration information for each search space within the alternative search space group as in the default search space group configuration. In general, the PDCCH configuration can include any suitable number of alternative search space group configurations (e.g., about 3, 4, 5 or more). In an embodiment, the BS may release or de-configure a search space group via an RRC PDCCH configuration, for example, including a SearchSpaceToReleaseList.

Figure 7:
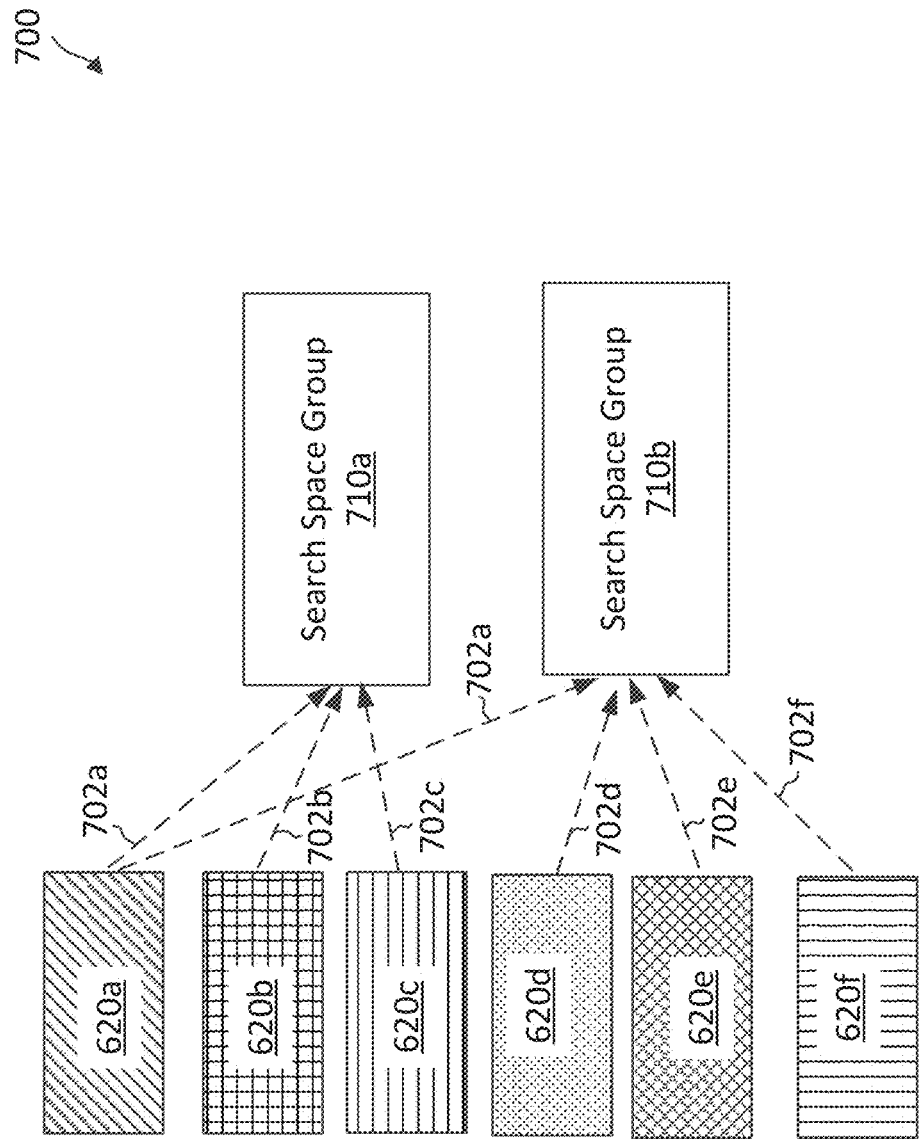
FIG. 7 illustrates a search space group configuration scheme according to some embodiments of the present disclosure.

FIG. 7 illustrates a DL control channel search space group configuration scheme 700 according to some embodiments of the present disclosure. The scheme 700 may be employed by a BS such as the BSs 105 and a UE such as the UEs 115 in a network such as the network 100. In particular, the BS may employ the scheme 700 to configure the UE with multiple search space groups to facilitate DL control channel monitoring with dynamic search space group switching. The scheme 700 is described using the same set of search spaces 620 as in the scheme 600, and may use the same reference numerals as in FIG. 6 for simplicity sake. The scheme 600 is substantially similar to the scheme 600. However, the scheme 700 defines search spaces and search space groups separately by utilizing a group association parameter in addition to configuration information (e.g., CORESET ID, starting slot, a symbol location in a slot, periodicity, and/or aggregation rules) discussed in the scheme 600. A group association parameter may indicate a search space group that is associated with a search space. FIG. 7 illustrates two search space groups 710a and 710b for simplicity of discussion and illustration, though it will be recognized that embodiments of the present disclosure may scale to many more search space groups 710 (e.g., about 3, 4, 5 or more). The search space groups 710 may be similar to the search space groups 610.

As an example, a search space configuration for the search space 620a may include a group association parameter indicating that the search space 620a belongs to the search space group 710a and the search space group 710b as shown by the dashed arrows 702a. A search space configuration for each of the search spaces 620b and 620c may include a group association parameter indicating the association with the search space group 710a as shown by the dashed arrows 702b and 702c, respectively. Similarly, a search space configuration for each of the search spaces 620d, 620e, and 620f may include a group association parameter indicating an association with the search space group 710b as shown by the dashed arrows 702d, 702e, and 702f, respectively. As can be observed, the search space groups 710a and 710b are the same as the search space groups 610a and 610b, respectively.

In an embodiment, when employing the scheme 700, the BS may use similar RRC configuration mechanisms described above (in FIG. 3 and FIG. 6) to configure the UE with multiple search space groups 710. However, each search space configuration may include a group association parameter in addition to an identifier identifying a CORESET used by the search space 620, a starting position (e.g., a starting slot 202), a symbol 206 for the search space 620, candidate aggregation information associated with the search space 620, a monitoring state parameter, and/or a triggering parameter. In addition, the BS may configure a UE to dynamically switch between the search space groups 710 via signaling messages and/or triggers as described in greater detail herein.

FIGS. 8A and 8B collectively illustrate a dynamic search space group switching scheme 800. The scheme 800 may be employed by BSs (e.g., the BSs 105 and 500) and UEs (e.g., the UEs 115 and 400) in a network (e.g., the network 100). The scheme 800 triggers a search space group switch using L1 signaling (e.g., in a PDCCH) and/or a timer. FIG. 8A illustrates a DL control channel monitoring configuration with dynamic search space group switch according to some embodiments of the present disclosure. FIG. 8B illustrates a DL control channel monitoring configuration with dynamic search space group switch according to some embodiments of the present disclosure. In FIGS. 8A and 8B, the x-axes represent time in some arbitrary units, and the y-axes represent time in some arbitrary units. For simplicity of discussion and illustration, FIGS. 8A and 8B illustrate the switching between two search space groups 810 (shown as 810b and 810a). However, similar mechanisms may be applied to switching among more than two search space groups 810 (e.g., about 3, 4, 5 or more).

In the scheme 800, a BS (e.g., BS 105 in FIG. 1) configures a UE (e.g., UE 115 in FIG. 1) with two search space groups 810b and 810a. The search space group 810b includes search spaces 820a, 820b, 820c, and 820d. The search space group 810a includes search spaces 820a and 820e. The search space groups 810 may be similar to the search space groups 610 and 710. The search spaces 820 may be similar to the search spaces 620. The BS may configure the search spaces 820 using similar mechanisms as described in the scheme 300 described above in FIG. 3. The BS may configure the search space groups 810 using similar mechanisms as described in the schemes 600 and 700 described above in FIGS. 6 and 7, respectively.

In FIGS. 8A and 8B, the search spaces 820a and 820c are located at a frequency or subcarrier range 804, and the search spaces 820b, 820d, and 820e are located at another frequency or subcarrier range 806. The search spaces 820a and 820e are located at a slot 202 boundary. The search spaces 820b, 820c, and 820d are within the slot 202 spaced apart from each other, for example, at a mini-slot (e.g., with a 2-symbol length) boundary. In an example, the BS may configure the search spaces 820a and 820c using the same CORESET (e.g., the CORESET 310), but with different symbol 206 locations. Alternatively, the BS may configure the search spaces 820a and 820c using different CORESETs and different symbol locations.

In an embodiment, the BS may configure each of the search spaces 820a, 820b, 820c, and 820d with a periodicity of about one slot 202 and may configure the search space 820e with a periodicity of about ten slots 202. Thus, the search space group 810b formed from the search spaces 820a, 820b, 820c, and 820d may provide a low-latency or frequent DL control channel monitoring, for example, at a mini-slot level (e.g., the mini-slots 208) as shown in the time periods $802_{(1)}$ and $802_{(3)}$. The search space group 810a formed from the search spaces 820a and 820e may be used as a default search space group for DL control channel monitoring at a slot-level, for example, shown in the time period $802_{(2)}$. The time period time period $802_{(2)}$ begins at time T0 in FIG. 8A and ends at time T1 in FIG. 8B. In general, the BS may configure one or more search spaces 820 from one or more CORESETs with various combinations of symbol locations and periodicities for each search space group 810 to create various time-frequency pattern for DL control channel monitoring.

In an embodiment, the UE may monitor for DL control information in the search spaces 820a, 820b, 820c, and 820d of the search space group 810b during the time period $802_{(1)}$. At time T0, the UE may switch from the search space group 810b to the search space group 810a based on a trigger 830. After the switch, the UE may monitor for DL control information in the search spaces 820a and 820e of the search space group 810a during the time period $802_{(2)}$ and stop monitoring in the search spaces 820b, 820c, and 820d of the search space group 810b. At time T1, the UE may switch from the search space group 810a to the search space group 810b based on a trigger 832. After the switch, the UE may monitor for DL control information in the search spaces 820a, 820b, 820c, and 820d of the search space group 810b during the time period 802(3) and stop monitoring in the search space 820e of the search space group 810a.

In an embodiment, the BS may configure the triggers 830 and 832 to be based on DCI signaling. For example, the BS may provide the trigger 830 by transmitting a DCI message in one or more search spaces 820a, 820b, 820c, and 802d within the search space group 810b during the time period $802_{(1)}$. The BS may provide the trigger 832 by transmitting a DCI message in one or more search spaces 820a and 820e within the search space group 810a during the time period 802(2). The DCI messages can be UE-specific DCI messages assigned to the UE. Alternatively, the DCI messages can be group-common (GC)-PDCCH messages assigned to multiple UEs. To improve robustness or reduce the change of the UE missing a switch trigger (e.g., the triggers 830 and 832), the BS may repeat the transmission of a DCI message for the trigger.

In an embodiment, the switching between the search space groups 810b and 810a may be based on traffic patterns or requirements similar to a sleep-wake cycle. For example, when there is traffic or data arrived for the UE, the BS may instruct the UE to switch from the slot-level search space group 810a to the mini-slot level search space group 810b. Alternatively, when there is no traffic or infrequent traffic for the UE, the BS may instruct the UE to switch back to the slot-level search space group 810a. Thus, the UE may monitor for DL control information at a lower frequency when there is no traffic or a relatively small amount of traffic for the UE. Accordingly, the BS may perform the search space group switching based on traffic patterns to provide power savings at the UE.

In another embodiment, the BS may configure the UE to switch to a search space group (e.g., the search space group 810b) temporarily and may instruct the UE to use a timer to fallback to use the default search space group. In an example, the BS may configure the UE to switch to the frequent monitoring search space group 810b for a certain period of time (e.g., the time period $802_{(1)}$) and then fallback to the default search space group 810a at the end of the time period when no grant is received from the BS. Thus, the UE may start a timer according to the given period and fallback to the default search space group upon expiration of the timer. In an example, the BS may instruct the UE to use the default search space group 810a for a certain period of time and switch to the search space group 810b upon receiving a scheduling grant from the BS. Thus, the triggers 830 and 832 can be triggered by a timer, the detection of a scheduling grant, and/or the lack of detection of a scheduling grant.

Figure 9:
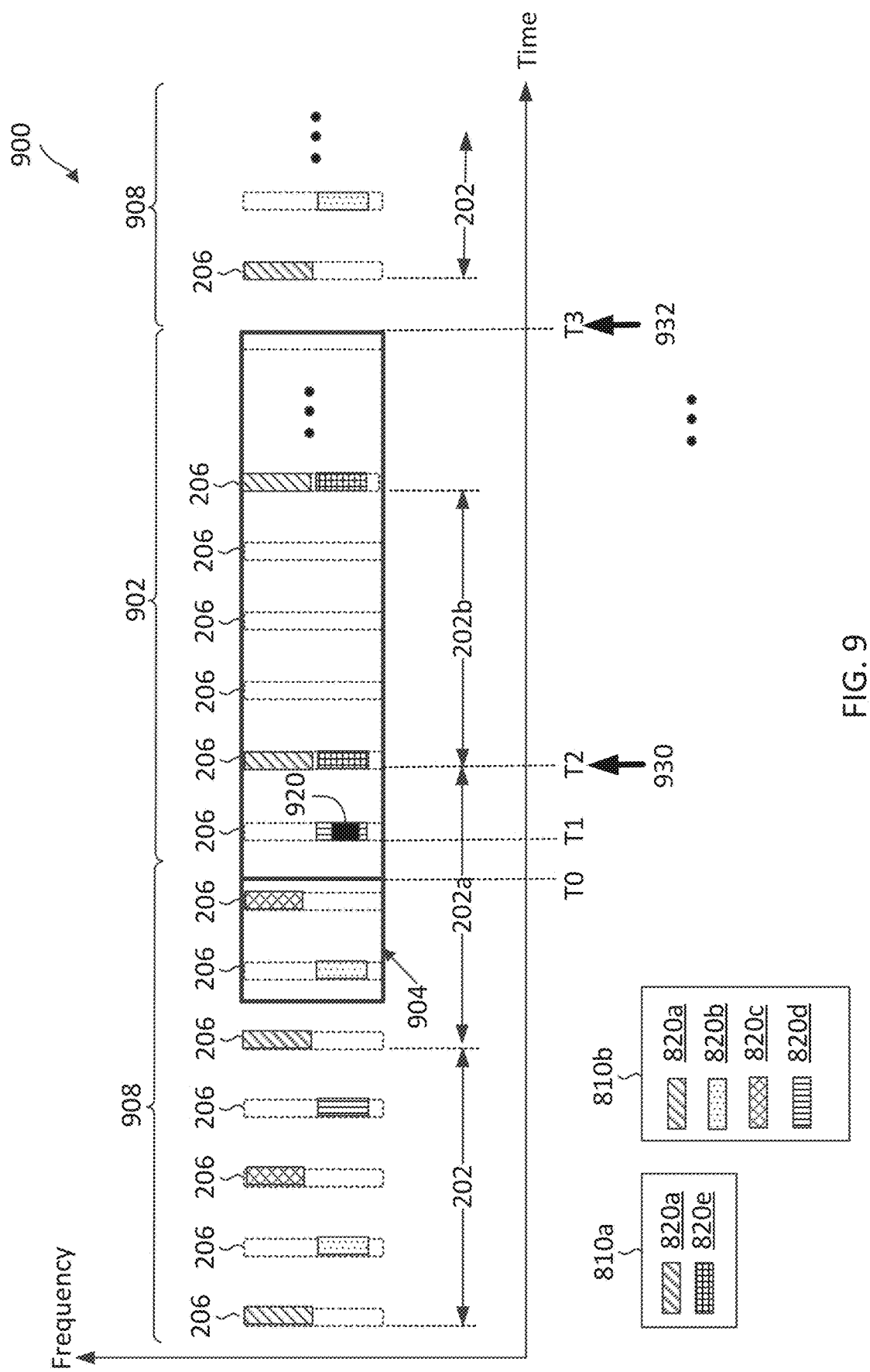
FIG. 9 illustrates a DL control channel monitoring scheme with dynamic search space group switching according to some embodiments of the present disclosure.

FIG. 9 illustrates a DL control channel monitoring scheme 900 with dynamic search space group switching according to some embodiments of the present disclosure. The scheme 900 may be employed by a BS such as the BSs 105 and a UE such as the UEs 115 in a network such as the network 100. In particular, the BS may employ the scheme 900 to configure the UE with dynamic search space group switching for DL control channel monitoring when operating in an unlicensed spectrum or a shared spectrum. In FIG. 9, the x-axis represents time in some arbitrary units. The scheme 900 is described using the transmission frame structure 200 of FIG. 2 and the search space groups 810b and 810a and may use the same reference numerals in FIGS. 2 and 8 for simplicity sake.

In the scheme 900, a BS (e.g., BS 105 in FIG. 1) communicates with a UE (e.g., UE 115 in FIG. 1) over an unlicensed frequency band based on a common timeline as shown by slots 202. The BS may configure the UE with the search space groups 810b and 810a. The BS may contend for a COT in the unlicensed frequency band by perform an LBT 904. The LBT 904 may be a CAT4 LBT. The LBT 904 may be a pass. In other words, the BS won the contention and may gain a COT 902 for communications with the UE. As described above, an LBT may complete at any time. For example, the LBT 904 completes at time T0 in the middle of a slot 202a. To avoid having a significant idle period at the beginning of the COT 902, the BS may configure the UE to monitor for DL control channel monitoring at a high frequency. For example, the BS may configure the UE to use the search space group 810b for frequent monitoring outside of a COT 902 (e.g., frequent monitoring during the period 908) and may switch the UE to a less frequent monitoring within the COT 902. Thus, after gaining the COT 902, the BS may transmit a scheduling grant 920 in the next mini-slot boundary at time T1 instead of waiting till the beginning of the next slot 202b. After the initial schedule (e.g., the scheduling grant 920), the BS may configure the UE to switch to the search space group 810a with less frequent monitoring as shown by the trigger 930 at time T2. At the end of the COT 902, the BS may configure the UE switch to search space group 810b for the frequent monitoring as shown by the trigger 932 at time T3.

In an embodiment, the BS may configure the UE to perform search space group switch based on a detection of a start of a COT and/or an end of a COT. After gaining the COT 902, the BS may transmit various signals to provide UEs with information associated with the COT 902. For example, the BS may transmit a COT structure information signal indicating slot format information for slots 202 within the COT 902, duration of the COT 902, and any other information to facilitate communications within the COT 902. The BS may transmit reference signals (e.g., a demodulation reference signal (DMRS)) in certain symbols 206 to facilitate channel estimation at the UE. The BS may transmit other signals, such as a group common-PDCCH (GC-PDCCH) signal, to indicate the start of the COT 902. The UE may detect the start of the COT 902 based on a detection of a COT structure information signal, a reference signal, a GC-PDCCH signal, and/or any other COT indication signal from the BS and may perform a switch to the search space group 810b for based on the detection. The UE may determine the end of the COT 902 based on the COT duration information, for example, received from the COT structure information signal. For example, the UE may start a timer upon detecting the beginning of a COT using the COT duration information. Upon expiration of the timer, the UE may switch to the search space group 810b for more frequent DL control channel monitoring until the BS acquires another COT. Alternatively, the BS may also transmit a signal to indicate the end of the COT 902.

As can be observed, the scheme 900 provides the BS with the flexibility to configure the UE to perform frequent DL control channel monitoring outside of a COT (e.g., the COT 902) and less frequent DL control channel monitoring within a COT. Accordingly, the scheme 900 may reduce idle time at the beginning of a COT and provide better spectrum utilization efficiency without increasing power consumption at the UE at all time.

Figure 10:
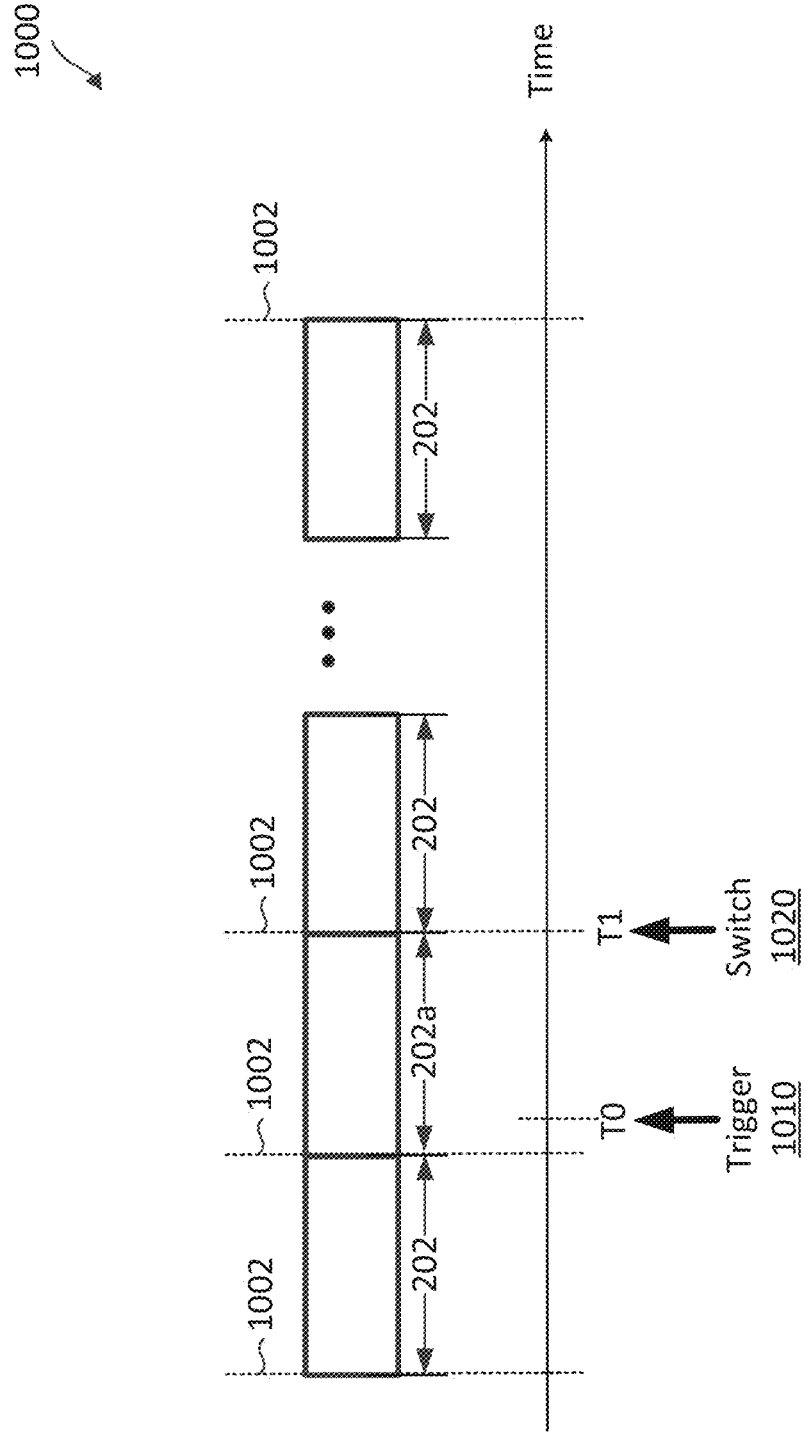
FIG. 10 illustrates a DL control channel monitoring scheme with dynamic search space group switching according to some embodiments of the present disclosure.

FIG. 10 illustrates a DL control channel monitoring scheme 1000 with dynamic search space group switching according to some embodiments of the present disclosure. The scheme 1000 may be employed by a BS such as the BSs 105 and a UE such as the UEs 115 in a network such as the network 100. In particular, the BS may employ the scheme 1000 to configure the UE with dynamic search space group switching and reference switching timelines. In FIG. 10, the x-axis represents time in some arbitrary units. The scheme 1000 is described using the transmission frame structure 200 of FIG. 2, and may use the same reference numerals in FIG. 2 for simplicity sake.

In the scheme 1000, a BS (e.g., BS 105 in FIG. 1) configures a UE (e.g., UE 115 in FIG. 1) with a set of switching timelines 1002 where search space group switch may occur. The switching timelines 1002 may be aligned to the slot 202 boundary as shown or may be alternatively configured to be at other time. For example, a trigger 1010 for switching from a first search space group (e.g., the search space group 610a, 710a, and/or 810a) to a second search space group (e.g., the search space group 610b, 710b, and/or 810b) may occur at time T0. The trigger 1010 may be a DCI message, a timer expiration, a start of a COT (e.g., the COT 902), an end of a COT, a detection of a scheduling grant, or a lack of a detection of a scheduling grant. Since the trigger 1010 occurs in the middle of the slot 202a, the search space group switch 1020 may occur at the next timeline 1002 (e.g., at time T1). In other words, at time T0, the UE detects the trigger 1010 at time T0. The UE may continue to use a current search space group (e.g., the search space group 810b) for DL control channel monitoring and switch to use a next search space group (e.g., the search space group 810a) for DL control channel monitoring at the next timeline 1002 at time T1.

In an embodiment, a BS (e.g., BS 105 in FIG. 1) using any suitable combination of the schemes 300, 600, 700, 800, and 900 to configure a UE (e.g., UE 115 in FIG. 1) for DL control channel monitoring (e.g., PDCCH monitoring) with dynamic search space group switching.

Figure 11:
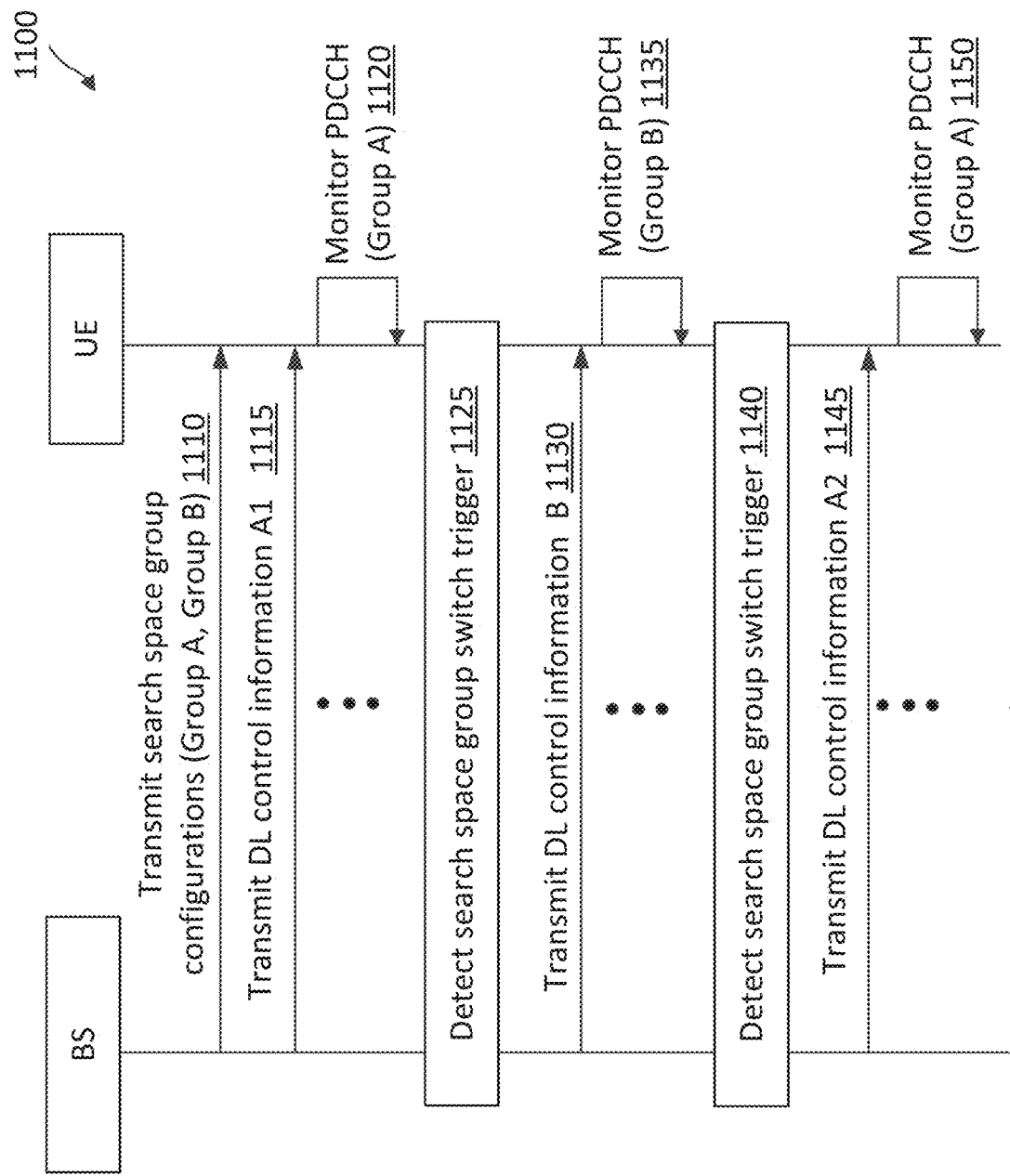
FIG. 11 is signaling diagram illustrating a DL control channel communication method with dynamic search space group switching according to some embodiments of the present disclosure.

FIG. 11 is a signaling diagram illustrating a DL control channel communication method 1100 with dynamic search space group switching according to some embodiments of the present disclosure. The method 1100 may be implemented between a BS (e.g., BS 105 or BS 500) and a UE (e.g., the UE 115 or UE 400). The method 1100 may employ similar mechanisms as in the structure 200 described above with respect to FIG. 2 and/or schemes 300, 600, 700, 800, 900, and 1000 described above with respect to FIGS. 3, 6, 7, 8, 9, and 10, respectively. Steps of the method 1100 can be executed by computing devices (e.g., a processor, processing circuit, and/or other suitable component) of the BS and the UE. In an example, the BS may utilize one or more components, such as the processor 502, the memory 504, the DL control channel module 508, the HARQ module 509, the transceiver 510, the modem 512, and the one or more antennas 516, to execute the steps of method 1100. The UE may utilize one or more components, such as the processor 402, the memory 404, the DL control channel module 408, the HARQ module 409, the transceiver 410, the modem 412, and the one or more antennas 416, to execute the steps of method 1100. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the BS transmits a search space group configuration indicating a search space group A and a search space group B. The group A may be a default search space group similar to the search space groups 610a, 710a, and/or 810a. The group B may be an alternative search space group similar to the search space groups 610b, 710b, and/or 810b. The search space group configuration may include configuration information for each search space (e.g., the search spaces 620 and 820) within the group A and each search space within the group B, for example, using the scheme 600 or 700 described above with respect to FIGS. 6 and 7, respectively. The search space group configuration may include a monitoring state parameter, a triggering parameter, and/or a group association parameter for each search space as described above in the schemes 600 and 700. For example, the monitoring state parameter may indicate an always-on state, a default-on state, or a default-off state for DL channel monitoring. The triggering state parameter may indicate whether a search space group switch trigger (e.g., the triggers 830, 832, 930, 932, and 1010) may be based on a DCI message from the BS, a timer, a reception of a scheduling grant, a lack of reception of a scheduling grant for a time period, a detection of a start of a COT (e.g., the COT 902), a detection of an end of a CO. In an example, the BS may provide the search space group configurations in an RRC PDCCH configuration message. Means for performing the functionality of step 1110 can, but not necessarily, include, for example, DL control channel module 508, transceiver 510, antennas 516, processor 502, and/or memory 504 with reference to FIG. 5.

At step 1115, the BS transmits DL control information Al (e.g., scheduling information and/or slot 202 information) in a search space within the group A. Means for performing the functionality of step 1115 can, but not necessarily, include, for example, DL control channel module 508, transceiver 510, antennas 516, processor 502, and/or memory 504 with reference to FIG. 5.

At step 1120, the UE monitors one or more search spaces in the default group A for DL control information based on the search space group configuration. Subsequently, the UE may communicate with the BS based on DL control information received from the BS. Means for performing the functionality of step 1120 can, but not necessarily, include, for example, DL control channel module 408, transceiver 410, antennas 416, processor 402, and/or memory 404 with reference to FIG. 4.

At step 1125, the UE detects a trigger (e.g., the triggers 830, 832. 930, 932, and/or 1010) for a search space group switch, for example, based on a detection or trigger condition indicated the triggering parameter in the configuration. The BS may also be aware of the trigger since the triggering condition is configured by the BS. Means for performing the functionality of step 1125 can, but not necessarily, include, for example, DL control channel module 408, transceiver 410, antennas 416, processor 402, and/or memory 404 with reference to FIG. 4.

At step 1130, the BS transmits DL control information B (e.g., including scheduling information and/or slot 202 information) in a search space within the group B. Means for performing the functionality of step 1130 can, but not necessarily, include, for example, DL control channel module 508, transceiver 510, antennas 516, processor 502, and/or memory 504 with reference to FIG. 5.

At step 1135, upon detecting the trigger, the UE switches to monitor search spaces in the group B for DL control information. Subsequently, the UE may communicate with the BS based on DL control information received from the BS. Means for performing the functionality of step 1135 can, but not necessarily, include, for example, DL control channel module 408, transceiver 410, antennas 416, processor 402, and/or memory 404 with reference to FIG. 4.

At step 1140, the UE detects a trigger to switch back to the default group A, for example, based on a detection or trigger condition indicated by the triggering parameter in the configuration. Means for performing the functionality of step 1140 can, but not necessarily, include, for example, DL control channel module 408, transceiver 410, antennas 416, processor 402, and/or memory 404 with reference to FIG. 4.

At step 1145, the BS transmits DL control information A2 (e.g., including scheduling information and/or slot 202 information) in a search space within the group A. Means for performing the functionality of step 1145 can, but not necessarily, include, for example, DL control channel module 408, transceiver 410, antennas 416, processor 402, and/or memory 404 with reference to FIG. 4.

At step 1150, upon detecting the trigger, the UE switches to monitor search spaces in the group A for DL control information. Subsequently, the UE may communicate with the BS based on DL control information received from the BS. Means for performing the functionality of step 1150 can, but not necessarily, include, for example, DL control channel module 408, transceiver 410, antennas 416, processor 402, and/or memory 404 with reference to FIG. 4.

Figure 12:
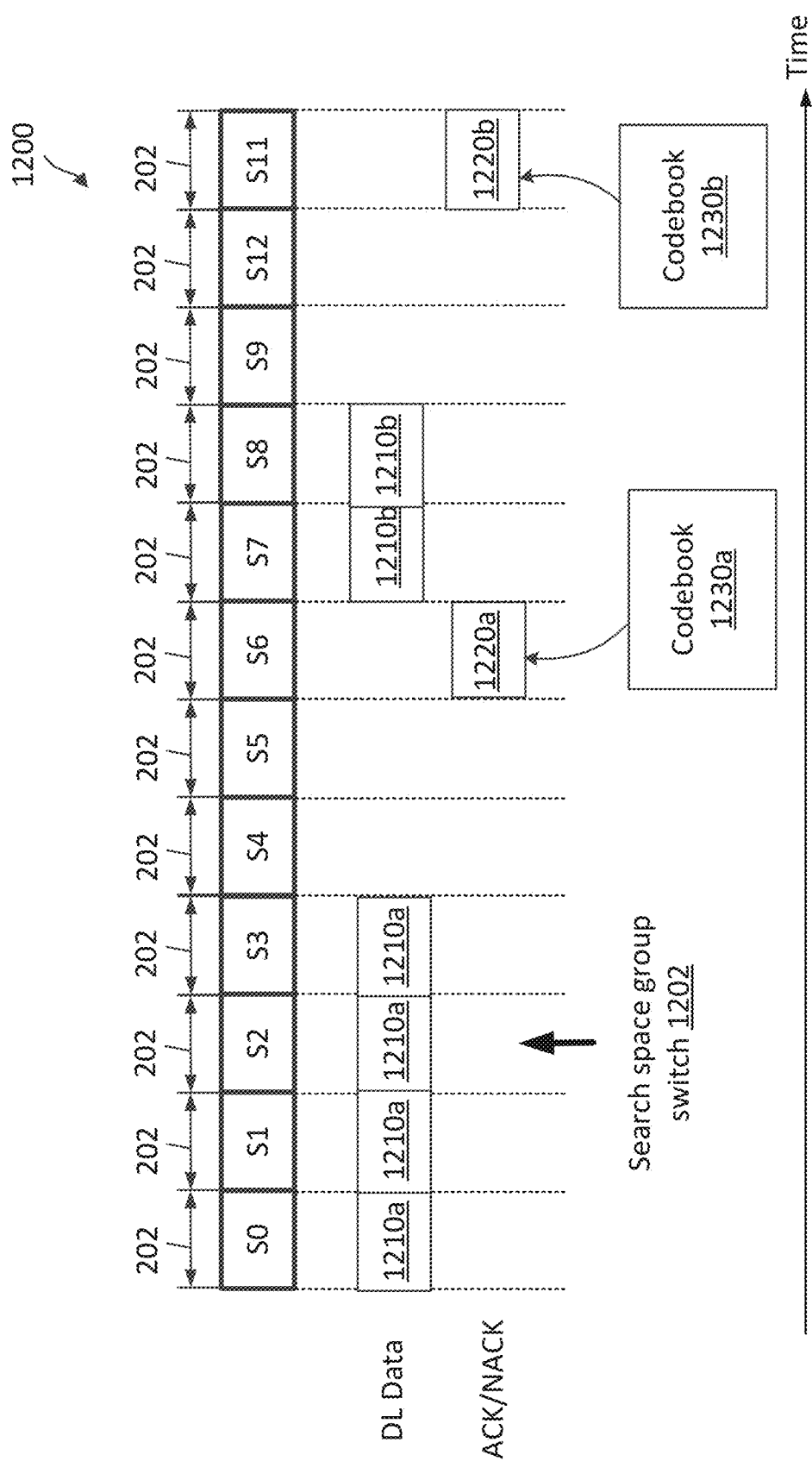
FIG. 12 illustrates a hybrid automatic repeat request (HARQ) acknowledgement/negative acknowledgment (ACK/NACK) feedback scheme with dynamic search space group switching according to some embodiments of the present disclosure.

FIG. 12 illustrates a HARQ ACK/NACK feedback scheme 1200 with dynamic search space group switching according to some embodiments of the present disclosure. The scheme 1200 may be employed by a BS such as the BSs 105 and a UE such as the UEs 115 in a network such as the network 100. In particular, the BS may employ the scheme 1200 to communicate HARQ ACK/NACK feedback with the UE when using dynamic search space group switching described above in the schemes 800, 900, 1000 in FIGS. 8, 9, and 10, respectively and the method 1100 in FIG. 11. In FIG. 12, the x-axis represents time in some arbitrary units. The scheme 1200 is described using the transmission frame structure 200 of FIG. 2, and may use the same reference numerals in FIG. 2 for simplicity sake. Further, the slot 202 are shown as S0 to S11.

In the scheme 1200, a BS (e.g., BS 105 in FIG. 1) transmits DL data blocks 1210a to a UE (e.g., UE 115 in FIG. 1) during the slots 202 indexed S0, S1, S2, S3, and S4. Each DL data block 1210a may correspond to a transport block. The UE may transmit an ACK/NACK feedback 1220a indicating the reception statuses for DL data blocks 1210a during the slot indexed S6, for example, based on a K1 parameter indicating a time period between a DL data reception and a corresponding ACK or NACK transmission. The ACK/NACK feedback 1220a may include a ACK/NACK indication for each DL data block 1210a (e.g., a transport block). For example, when the UE successfully receives a DL data block 1210a, the UE may transmit an ACK for a corresponding ACK/NACK indication. Conversely, when the UE detects a failure in the reception and/or decoding of a DL data block 1210a, the UE may transmit an NACK for a corresponding ACK/NACK indication. The ACK/NACK feedback 1220a transmission may be part of a HARQ procedure.

In a HARQ procedure, a transmitting node may transmit various coded versions of information data to a receiving node. For example, the transmitting node may transmit a first coded version of information data to the receiving node. Upon receiving an NACK from the receiving node, the transmitting node may transmit a second coded version of the information data to the receiving node. The receiving node may combine the received first coded version and the received second coded version for error correction when both the received first coded version and the received second coded version are erroneous.

In an example, the UE may indicate an ACK/NACK feedback 1220 for group of the DL data blocks 1210a based on a HARQ ACK/NACK codebook, where the size of the codebook may be associated with a DL control channel search space group. The scheme 1200 allows different HARQ ACK/NACK codebooks based on the search space group in use. In other words, the scheme 1200 allows dynamic HARQ ACK/NACK codebook switching. In some instances, a previous search space group before a switch may be associated with a larger codebook size than a search space group after the switch. To overcome this, the scheme 1200 allows a UE to continue to use a codebook based on a previous search space group when a search space group switch occurs within the transmission of DL data blocks 1210 that are associated with the same HARQ ACK/NACK feedback 1220.

As an example, the BS configures the UE to use a search space group A (e.g., the search space group 610a, 710a, and/or 810a) during the slots 202 indexed S0, S1, and S2. The BS triggers a switch 1202 to a search space group B (e.g., the search space group 610b, 710b, and/or 810b) in the within the slot 202 indexed S2. When the UE transmits the ACK/NACK feedback 1220a at the slot 202 indexed S6, the UE may use a codebook 1230a associated with search spaces in the search space group A for the ACK/NACK feedback 1220a.

The BS transmits DL data blocks 1210b during the slots 202 indexed S7 and S8 after the switch 1202. The UE may transmit an ACK/NACK feedback 1220b indicating the reception status of the DL data 1210b during the slot indexed S11. The UE may transmit the ACK/NACK feedback 1220b using a codebook 1230b associated with search spaces in the search space group B.

In another embodiment, the BS may configure the UE to use a semi-static codebook for HARQ ACK/NACK transmission independent from search space group switches. The BS may configure the UE with a codebook having a size accounting for the worst case (e.g., the greatest number of ACK/NACK indications at each feedback) across all search space group configurations. The UE may send a NACK feedback with padding for unused bits.

Figure 13:
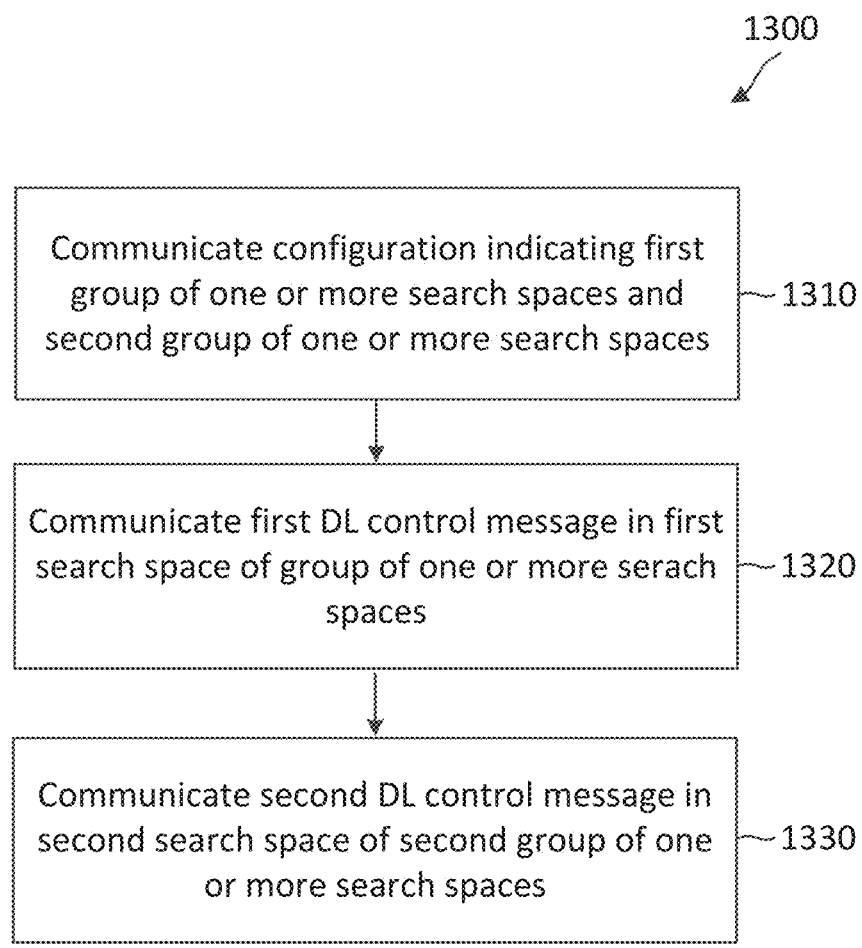
FIG. 13 is a flow diagram of a communication method according to some embodiments of the present disclosure.

FIG. 13 is a flow diagram of a communication method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115 or UE 400, and may utilize one or more components, such as the processor 402, the memory 404, the DL control channel module 408, the HARQ module 409, the transceiver 410, the modem 412, and the one or more antennas 416, to execute the steps of method 1300. In another example, a wireless communication device, such as the BS 105 or BS 500, may utilize one or more components, such as the processor 502, the memory 504, the DL control channel module 508, the transceiver 510, the modem 512, and the one or more antennas 516, to execute the steps of method 1300. The method 1300 may employ similar mechanisms as in the structure described above with respect to FIG. 2 and/or the schemes 300, 600, 700, 800, 900, 1000, and 1200 described with respect to FIGS. 3, 6, 7, 8, 9, 10, and 12, respectively, and/or the method 1100 described with respect to FIG. 11. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes communicating, by a first wireless communication device with a second wireless communication device, a configuration indicating a first group of one or more search spaces (e.g., the search spaces 620 and 820) and a second group of one or more search spaces (e.g., the search spaces 620 and 820), where at least one of the first group or the second group includes at least one search space not included in an other of the first group or the second group. In an example, the first group may be a default search space group similar to the search space groups 610a, 710a, and/or 810a and the second group may be an alternative search space group similar to the search space groups 610b, 710b, and/or 810b. In some instances, means for performing the functionality of step 1310 can, but not necessarily, include, for example, DL control channel module 408, transceiver 410, antennas 416, processor 402, and/or memory 404 with reference to FIG. 4. In some instances, means for performing the functionality of step 1310 can, but not necessarily, include, for example, DL control channel module 508, transceiver 510, antennas 516, processor 502, and/or memory 504 with reference to FIG. 5.

At step 1320, the method 1300 includes communicating, by the first wireless communication device with the second wireless communication device, a first downlink control message (e.g., including scheduling information and/or slot information) in a first search space of the first group of one or more search spaces. In some instances, means for performing the functionality of step 1320 can, but not necessarily, include, for example, DL control channel module 408, transceiver 410, antennas 416, processor 402, and/or memory 404 with reference to FIG. 4. In some instances, means for performing the functionality of step 1310 can, but not necessarily, include, for example, DL control channel module 508, transceiver 510, antennas 516, processor 502, and/or memory 504 with reference to FIG. 5.

At step 1330, the method 1300 includes communicating, by the first wireless communication device with the second wireless communication device, a second downlink control message (e.g., including scheduling information and/or slot information) in a second search space of the second group of one or more search spaces. In some instances, means for performing the functionality of step 1330 can, but not necessarily, include, for example, DL control channel module 408, transceiver 410, antennas 416, processor 402, and/or memory 404 with reference to FIG. 4. In some instances, means for performing the functionality of step 1310 can, but not necessarily, include, for example, DL control channel module 508, transceiver 510, antennas 516, processor 502, and/or memory 504 with reference to FIG. 5.

In an embodiment, the first wireless communication device may correspond to a BS (e.g., BS 105 or 500) and the second wireless communication device may correspond to a UE (e.g., UE 115 or 400). In such an embodiment, the first wireless communication device may transmit the configuration, the first downlink control message, and the second downlink control to the second wireless communication device.

In an embodiment, the first wireless communication device may correspond to a UE (e.g., UE 115 or 400) and the second wireless communication device may correspond to a BS (e.g., BS 105 or 500). In such an embodiment, the first wireless communication device may receive the configuration, the first downlink control message, and the second downlink control from the second wireless communication device.

In an embodiment, each search space in the first group and each search space in the second group includes a set of candidates for downlink control message communication.

In an embodiment, the first wireless communication device switches from the first group to the second group in response to a trigger (e.g., the triggers 830, 832, 930, 932, 1010, and 1202). For example, the communication in the second search space of the second group is in response to the switching. In an embodiment, the first wireless communication device monitors the one or more search spaces in the first group for the first downlink control message. The first wireless communication device monitors, by the first wireless communication device in response to the switching, the one or more search spaces in the second group for the second downlink control message. In an embodiment, the first wireless communication device communicates, with the second wireless communication device in the one or more search spaces of the first group, a third downlink control message (e.g., a UE-specific DCI or a GC-PDCCH) indicating the trigger. In an embodiment, the trigger is associated with a timer. In an embodiment, the trigger is associated with at least one of a start of a COT (e.g., the COT 902) or an end of the COT. In an embodiment, the second downlink control message is communicated further based on a timeline (e.g., the timeline 1002) for switching from the first group to the second group. In an embodiment, the first wireless communication device communicates, with the second wireless communication device, a trigger configuration indicating that the trigger is based on at least one of a downlink control message (e.g., a UE-specific DCI or a GC-PDCCH), a timer expiration, a COT (e.g., the COT 902) start, a COT end, or a timeline (e.g., the timeline 1002) for switching between the first group and the second group.

In an embodiment, the configuration includes a first group configuration and a second group configuration. The first group configuration includes parameters associated with the one or more search spaces in the first group. The second group configuration includes parameters associated with the one or more search spaces in the second group. In an embodiment, the configuration includes a group association parameter for each search space in each of the first group and the second group indicating an association between the search space and at least one of the first group or the second group.

In an embodiment, the configuration indicates whether the first group or the second group is a default search space group for downlink control message monitoring.

In an embodiment, the first search space and the second search space correspond to the same search space. In an embodiment, the configuration includes a monitoring state parameter for the first search space indicating that the first search space is a common search space for downlink control message monitoring.

In an embodiment, the configuration is an RRC configuration.

In an embodiment, the first wireless communication device communicates, with the second wireless communication device, first data (e.g., the DL data blocks 1210a) during a first time period. The first wireless communication device communicates, with the second wireless communication device, a first ACK/NACK feedback (e.g., the ACK/NACK feedback 1220a) associated with the first data during a second time period after the first time period. The first ACK/NACK feedback is communicated based on a first codebook size (e.g., codebook 1230a size) associated with the one or more search spaces in the first group. In an embodiment, the first wireless communication device detects a trigger (e.g., the triggers 830, 832, 930, 932, 1010, or 1210) for switching from the first group to the second group during the first time period. The first wireless communication device communicates, with the second wireless communication device, second data during (e.g., the DL data blocks 1210b) a third time period after the second time period. The first wireless communication device communicates, with the second wireless communication device, a second ACK/NACK feedback (e.g., the ACK/NACK feedback 1220b) associated with the second data during a fourth time period after the third time period. The second ACK/NACK feedback is communicated based on a second codebook size (e.g., codebook 1230b size) associated with the one or more search spaces in the second group.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication in an unlicensed frequency band at a user equipment (UE), the method comprising:
   receiving a configuration indicating a first group of two or more physical downlink control channel (PDCCH) search spaces and a second group of one or more PDCCH search spaces, wherein at least one of the first group or the second group includes at least one PDCCH search space not included in an other of the first group or the second group, and wherein at least one of the first group or the second group includes one or more PDCCH search spaces within a channel occupancy time (COT) of the unlicensed frequency band and at least another one of the of the first group or the second group includes one or more PDCCH search spaces outside the COT;
   switching from PDCCH monitoring in the first group to PDCCH monitoring in the second group in response to receiving a first group common-physical downlink control channel (GC-PDCCH) downlink control information (DCI) message in a first PDCCH search space of the first group of two or more PDCCH search spaces, the first GC-PDCCH DCI message indicating a beginning of a COT, wherein the first group is associated with a first monitoring periodicity and the second group is associated with a second monitoring periodicity different from the first monitoring periodicity;
   upon switching from PDCCH monitoring in the first group to PDCCH monitoring in the second group, activating a timer for a predetermined period of time; and
   when a grant is not received within the predetermined period of time, switching from PDCCH monitoring in the second group to PDCCH monitoring in the first group upon expiration of the predetermined period of time.

2. The method of claim 1, wherein the configuration comprises:
   for each PDCCH search space of the two or more PDCCH search spaces in the first group, a first group association parameter indicating each PDCCH search space is within the first group configured for the UE; and
   for each PDCCH search space of the one or more PDCCH search spaces in the second group, a second group association parameter indicating each PDCCH search space is within the second group configured for the UE,
   wherein the method further comprises:
      receiving, based on the first group association parameter, the first GC-PDCCH DCI message in the first PDCCH search space of the first group of two or more PDCCH search spaces; and receiving, based on the second group association parameter and detecting a trigger, a second GC-PDCCH DCI message in a second PDCCH search space of the second group of one or more PDCCH search spaces.

3. The method of claim 2, further comprising:
monitoring the two or more PDCCH search spaces in the first group for the first GC-PDCCH DCI message; and
monitoring, in response to the trigger, the one or more PDCCH search spaces in the second group for the second GC-PDCCH DCI message.

4. The method of claim 2, wherein the receiving the first GC-PDCCH DCI message includes:
receiving the first GC-PDCCH DCI message including the trigger.

5. The method of claim 2, wherein the trigger is associated with the timer.

6. The method of claim 2, wherein the trigger is associated with an end of the COT.

7. The method of claim 2, wherein the trigger is associated with a timeline for switching from the first group to the second group.

8. The method of claim 7, wherein the timeline for switching from the first group to the second group is aligned to a slot boundary.

9. The method of claim 1, wherein the first PDCCH search space and the second PDCCH search space correspond to the same search space.

10. The method of claim 1, wherein the configuration is a radio resource control (RRC) configuration.

11. A user equipment (UE), comprising:
a memory;
a transceiver; and
a processor in communication with the memory and the transceiver, wherein the UE is configured to:
receive a configuration indicating a first group of two or more physical downlink control channel (PDCCH) search spaces and a second group of one or more PDCCH search spaces, wherein at least one of the first group or the second group includes at least one PDCCH search space not included in an other of the first group or the second group, and wherein at least one of the first group or the second group includes one or more PDCCH search spaces within a channel occupancy time (COT) of an unlicensed frequency band and at least another one of the of the first group or the second group includes one or more PDCCH search spaces outside the COT;
switch from PDCCH monitoring in the first group to PDCCH monitoring in the second group in response to receiving a first group common-physical downlink control channel (GC-PDCCH) downlink control information (DCI) message in a first PDCCH search space of the first group of two or more PDCCH search spaces, the first GC- PDCCH DCI message indicating a beginning of a COT, wherein the first group is associated with a first monitoring periodicity and the second group is associated with a second monitoring periodicity different from the first monitoring periodicity;
upon switching from PDCCH monitoring in the first group to PDCCH monitoring in the second group, activate a timer for a predetermined period of time; and
when a grant is not received within the predetermined period of time, switch from PDCCH monitoring in the second group to PDCCH monitoring in the first group upon expiration of the predetermined period of time.

12. The UE of claim 11, wherein the configuration comprises:
for each PDCCH search space of the two or more PDCCH search spaces in the first group, a first group association parameter indicating each PDCCH search space is within the first group configured for the UE; and
for each PDCCH search space of the one or more PDCCH search spaces in the second group, a second group association parameter indicating each PDCCH search space is within the second group configured for the UE, wherein the UE is further configured to:
receive, based on the first group association parameter, the first GC-PDCCH DCI message in the first PDCCH search space of the first group of two or more PDCCH search spaces; and
receive, based on the second group association parameter and detecting a trigger, a second GC-PDCCH DCI message in a second PDCCH search space of the second group of one or more PDCCH search spaces.

13. The UE of claim 12, wherein the UE is further configured to:
monitor the two or more PDCCH search spaces in the first group for the first GC-PDCCH DCI message; and
monitor, in response to the trigger, the one or more PDCCH search spaces in the second group for the second GC-PDCCH DCI message.

14. The UE of claim 12, wherein the UE is configured to receive the first GC-PDCCH DCI message including the trigger.

15. The UE of claim 12, wherein the trigger is associated with the timer.

16. The UE of claim 12, wherein the trigger is associated with an end of the COT.

17. The UE of claim 12, wherein the trigger is associated with a timeline for switching from the first group to the second group.

18. The UE of claim 17, wherein the timeline for switching from the first group to the second group is aligned to a slot boundary.

19. The UE of claim 11, wherein the first PDCCH search space and the second PDCCH search space correspond to the same search space.

20. The UE of claim 11, wherein the configuration is a radio resource control (RRC) configuration.

21. A non-transitory computer-readable medium having program code recorded thereon, the program code comprising instructions executable by a processor of a wireless communication device to cause the wireless communication device to:
receive a configuration indicating a first group of two or more physical downlink control channel (PDCCH) search spaces and a second group of one or more PDCCH search spaces, wherein at least one of the first group or the second group includes at least one PDCCH search space not included in an other of the first group or the second group, and wherein at least one of the first group or the second group includes one or more PDCCH search spaces within a channel occupancy time (COT) of an unlicensed frequency band and at least another one of the of the first group or the second group includes one or more PDCCH search spaces outside the COT;

switch from PDCCH monitoring in the first group to PDCCH monitoring in the second group in response to receiving a first group common-physical downlink control channel (GC-PDCCH) downlink control information (DCI) message in a first PDCCH search space of the first group of two or more PDCCH search spaces, the first GC-PDCCH DCI message indicating a beginning of a COT, wherein the first group is associated with a first monitoring periodicity and the second group is associated with a second monitoring periodicity different from the first monitoring periodicity;

upon switching from PDCCH monitoring in the first group to PDCCH monitoring in the second group, activate a timer for a predetermined period of time; and when a grant is not received within the predetermined period of time, switch from PDCCH monitoring in the second group to PDCCH monitoring in the first group upon expiration of the predetermined period of time.

22. The non-transitory computer-readable medium of claim 21, wherein the configuration comprises:

for each PDCCH search space of the two or more PDCCH search spaces in the first group, a first group association parameter indicating each PDCCH search space is within the first group; and for each PDCCH search space of the one or more PDCCH search spaces in the second group, a second group association parameter indicating each PDCCH search space is within the second group, wherein the program code further comprises instructions executable by the processor of the wireless communication device to cause the wireless communication device to:

receive, based on the first group association parameter, the first GC-PDCCH DCI message in the first PDCCH search space of the first group of two or more PDCCH search spaces; and receive, based on the second group association parameter and detecting a trigger, a second GC-PDCCH DCI message in a second PDCCH search space of the second group of one or more PDCCH search spaces.

23. The non-transitory computer-readable medium of claim 22, wherein the program code further comprises instructions executable by the processor of the wireless communication device to cause the wireless communication device to:

monitor the two or more PDCCH search spaces in the first group for the first GC-PDCCH DCI message; and monitor, in response to the trigger, the one or more PDCCH search spaces in the second group for the second GC-PDCCH DCI message.

24. The non-transitory computer-readable medium of claim 22, wherein the instructions causing the wireless communication device to receive the first GC-PDCCH DCI message comprise instructions for causing the wireless communication device to receive the first GC-PDCCH DCI message including the trigger.

25. The non-transitory computer-readable medium of claim 22, wherein the trigger is associated with the timer.

26. The non-transitory computer-readable medium of claim 22, wherein the trigger is associated with at least one of a start of the COT or an end of the COT.

27. The non-transitory computer-readable medium of claim 22, wherein the trigger is associated with a timeline for switching from the first group to the second group.

28. The non-transitory computer-readable medium of claim 27, wherein the timeline for switching from the first group to the second group is aligned to a slot boundary.

29. The non-transitory computer-readable medium of claim 21, wherein the first PDCCH search space and the second PDCCH search space correspond to the same search space.

30. The non-transitory computer-readable medium of claim 21, wherein the configuration is a radio resource control (RRC) configuration.

* * * * *